(12) United States Patent
Prosnitz et al.

(10) Patent No.: US 11,786,781 B2
(45) Date of Patent: Oct. 17, 2023

(54) COMBINATION STATIONARY EXERCISE EQUIPMENT

(71) Applicant: PROSNITZ SOLUTIONS LLC, Skokie, IL (US)

(72) Inventors: Joseph H. Prosnitz, Skokie, IL (US); Peter Kyle Gillespie, Andover, KS (US)

(73) Assignee: PROSNITZ SOLUTIONS LLC, Skokie, IL (US)

(*) Notice: Subject to any disclaimer, the term of this patent is extended or adjusted under 35 U.S.C. 154(b) by 196 days.

(21) Appl. No.: 17/140,573

(22) Filed: Jan. 4, 2021

(65) Prior Publication Data

US 2021/0197016 A1 Jul. 1, 2021

Related U.S. Application Data

(63) Continuation-in-part of application No. 16/048,770, filed on Jul. 30, 2018, now Pat. No. 10,881,897, (Continued)

(51) Int. Cl.
*A63B 22/06* (2006.01)
*A63B 22/00* (2006.01)
(Continued)

(52) U.S. Cl.
CPC ...... *A63B 22/0605* (2013.01); *A63B 22/0007* (2013.01); *A63B 22/0012* (2013.01);
(Continued)

(58) Field of Classification Search
CPC ............ A63B 22/0605; A63B 22/0007; A63B 22/0012; A63B 2022/0611;
(Continued)

(56) References Cited

U.S. PATENT DOCUMENTS

| 558,464 A | 4/1896 | Bascom |
| 3,259,398 A | 7/1966 | Hattan |

(Continued)

FOREIGN PATENT DOCUMENTS

| CA | 2434373 C | 7/2006 |
| CN | 202557720 U | 11/2012 |

(Continued)

OTHER PUBLICATIONS

International Search Report and Written Opinion issued in related application PCT/US2022/011102, dated Apr. 11, 2022, 9 pages.

(Continued)

*Primary Examiner* — Andrew S Lo
(74) *Attorney, Agent, or Firm* — Faegre Drinker Biddle & Reath LLP

(57) ABSTRACT

A modular exercise apparatus comprising a frame, a common drivetrain supported by the frame and including a common axle, a plurality of input receivers coupled to the common axle, and a resistance member operably coupled to the common axle and operable to provide resistance against rotation of the common axle, a first exercise attachment including a first drive member operably coupled to a first input receiver of the plurality of input receivers of the common drivetrain, and a second exercise attachment including a second drive member operably coupled to a second input receiver of the plurality of input receivers of the common drivetrain.

16 Claims, 18 Drawing Sheets

Related U.S. Application Data which is a continuation of application No. 15/136,560, filed on Apr. 22, 2016, now Pat. No. 10,039,953.

(60) Provisional application No. 62/153,289, filed on Apr. 27, 2015.

(51) Int. Cl.
*B62M 1/26* (2013.01)
*B62K 13/00* (2006.01)

(52) U.S. Cl.
CPC ............. *B62K 13/00* (2013.01); *B62M 1/26* (2013.01); *A63B 2022/067* (2013.01); *A63B 2022/0611* (2013.01); *A63B 2022/0647* (2013.01); *A63B 2022/0682* (2013.01)

(58) Field of Classification Search
CPC ...... A63B 2022/0647; A63B 2022/067; A63B 2022/0682; A63B 21/005; A63B 21/4043; A63B 22/001; A63B 22/0076; A63B 22/0664; A63B 21/225; A63B 22/0056; A63B 22/0087; A63B 22/203; A63B 2022/0035; A63B 21/015; A63B 2022/0079; A63B 2225/102; A63B 21/15; A63B 2210/50; B62K 13/00; B62M 1/26
See application file for complete search history.

(56) References Cited

U.S. PATENT DOCUMENTS

| | | | |
|---|---|---|---|
| 4,026,571 A | 5/1977 | Vereyken | |
| 4,141,587 A | 2/1979 | Holcomb | |
| 4,193,324 A | 3/1980 | Marc | |
| 4,212,480 A | 7/1980 | Mikina et al. | |
| 4,577,879 A | 3/1986 | Vereyken | |
| 4,666,173 A | 5/1987 | Graham | |
| 5,419,572 A | 5/1995 | Stiller et al. | |
| 5,511,810 A | 4/1996 | Tong | |
| 5,540,637 A | 7/1996 | Rodgers, Jr. | |
| 5,593,372 A | 1/1997 | Rodgers, Jr. | |
| 5,961,423 A * | 10/1999 | Sellers | A63B 22/0605 482/52 |
| 6,071,215 A * | 6/2000 | Raffo | A63B 22/0076 72/142 |
| 6,090,013 A | 7/2000 | Eschenbach | |
| 6,171,217 B1 | 1/2001 | Cutler | |
| 6,398,244 B1 | 6/2002 | Chueh | |
| 6,431,301 B1 | 8/2002 | Forbes | |
| 6,439,590 B1 | 8/2002 | Liang | |
| 6,557,657 B2 | 5/2003 | Persson | |
| 6,572,128 B2 | 6/2003 | Graf | |
| 6,648,353 B1 | 11/2003 | Cabal | |
| 6,659,486 B2 | 12/2003 | Eschenbach | |
| 6,663,127 B2 | 12/2003 | Miller | |
| 6,773,022 B2 | 8/2004 | Janssen | |
| D526,250 S | 8/2006 | Trumble et al. | |
| 7,140,626 B1 | 11/2006 | Keay | |
| 7,191,884 B2 | 3/2007 | Kanehisa et al. | |
| 7,296,813 B2 | 11/2007 | Montague et al. | |
| 7,455,623 B2 | 11/2008 | Wang | |
| 7,651,446 B1 | 1/2010 | Eschenbach | |
| 7,662,071 B2 | 2/2010 | Ditolla | |
| 7,717,446 B2 | 5/2010 | Pate et al. | |
| 7,797,841 B2 | 9/2010 | Moreno | |
| D633,416 S | 3/2011 | Teal et al. | |
| 7,909,348 B2 | 3/2011 | Klieber | |
| 7,967,313 B1 | 6/2011 | Eggert | |
| 8,029,009 B2 | 10/2011 | Teal et al. | |
| 8,061,728 B2 | 11/2011 | Teal et al. | |
| 8,123,242 B2 | 2/2012 | Teal et al. | |
| 8,128,111 B2 | 3/2012 | Scolari et al. | |
| 8,128,536 B2 | 3/2012 | Ditolla | |
| 8,162,337 B2 | 4/2012 | Teal et al. | |
| 8,181,977 B1 | 5/2012 | Bartlett | |
| 8,220,578 B2 | 7/2012 | Kerschgens Long | |
| 8,388,004 B2 | 3/2013 | Walter | |
| 9,260,156 B2 | 2/2016 | Brewer et al. | |
| 10,576,331 B2 | 3/2020 | Kuo | |
| 2004/0072657 A1* | 4/2004 | Arguilez | A63B 69/16 482/61 |
| 2005/0263978 A1 | 12/2005 | Ascher | |
| 2006/0019802 A1 | 1/2006 | Caird | |
| 2007/0021276 A1* | 1/2007 | Kuo | A63B 21/157 482/57 |
| 2007/0099764 A1* | 5/2007 | Eschenbach | A63B 22/001 482/52 |
| 2007/0213180 A1 | 9/2007 | Ditolla | |
| 2008/0119333 A1* | 5/2008 | Bowser | A63B 21/156 482/62 |
| 2008/0220945 A1* | 9/2008 | Chen | A63B 22/0605 482/57 |
| 2008/0248929 A1* | 10/2008 | Webber | A63B 21/0628 482/96 |
| 2009/0239714 A1* | 9/2009 | Sellers | A63B 22/0605 482/52 |
| 2012/0178592 A1 | 7/2012 | Chieh et al. | |
| 2014/0091551 A1 | 4/2014 | Walter | |
| 2014/0274574 A1* | 9/2014 | Shorten | A63B 22/0664 482/52 |
| 2018/0117393 A1* | 5/2018 | Ercanbrack | A63B 22/001 |

FOREIGN PATENT DOCUMENTS

| | | |
|---|---|---|
| EP | 0285858 A2 | 3/1988 |
| EP | 1930235 B1 | 6/2011 |
| KR | 10-2011-0067080 A | 6/2011 |
| WO | 2011/065637 A1 | 6/2011 |
| WO | 2011/157910 A1 | 12/2011 |
| WO | 2019/168518 A1 | 9/2019 |

OTHER PUBLICATIONS

International Search Report and Written Opinion issued in related application PCT/US2016/029007, dated Jul. 29, 2016, 11 pages.

* cited by examiner

COMBINATION STATIONARY EXERCISE EQUIPMENT

CROSS-REFERENCE TO RELATED APPLICATIONS

This patent application is a continuation-in-part of U.S. patent application Ser. No. 16/048,770, filed on Jul. 30, 2018, now U.S. Pat. No. 10,881,897, which is a continuation of U.S. patent application Ser. No. 15/136,560, filed on Apr. 22, 2016, now U.S. Pat. No. 10,039,953, which claims the priority benefit of U.S. Provisional Patent Application No. 62/153,289, filed on Apr. 27, 2015, the entirety of each being incorporated by reference herein.

TECHNICAL FIELD

The present disclosure relates to a stationary exercise machine that facilitates different work outs. More specifically, a single, stationary device incorporates at least a stationary bicycle, elliptical machine, and a rowing machine, the stationary device using a single common drive for providing resistance during use.

BACKGROUND

Exercise equipment can be an important factor in maintaining a healthy lifestyle. Exercise equipment may be purchased for commercial or personal use. Various equipment provides functionalities that allow a user to engage in specific activities. If a user likes to engage in various exercises, it may become necessary to purchase or to have access to multiple different machines to be able to engage in the various activities. However, in commercial and residential application, floor space may be limited.

Furthermore, different equipment may be desired by different users and therefore results in an accumulation of equipment having components that are duplicative, the redundancies both resulting in increased cost and less available space.

Because different equipment is created for different purposes, each piece of equipment is often independent and requires knowledge of operation of each independent machine.

Hence, in light of the aforementioned, there is a need for exercise equipment that provides multiple functionalities, can be customized to the needs of a specific user, and can be altered to include increased or changed functionality while limiting the redundancies of components when the functionalities are increased or swapped out.

SUMMARY

A reconfigurable exercise machine is provided. The exercise machine includes a common drive train to which various attachments may be coupled.

According to one example ("Example 1"), a modular exercise apparatus is provided, the modular exercise apparatus comprising a frame, a common drivetrain supported by the frame and including a common axle, a plurality of input receivers coupled to the common axle, and a resistance member operably coupled to the common axle and operable to provide resistance against rotation of the common axle, a first exercise attachment including a first drive member operably coupled to a first input receiver of the plurality of input receivers of the common drivetrain, and a second exercise attachment including a second drive member operably coupled to a second input receiver of the plurality of input receivers of the common drivetrain.

According to another example ("Example 2"), further to Example 1, the common drivetrain includes an output member, wherein the output member is operably coupled to the resistance member.

According to another example ("Example 3"), further to Example 1, the plurality of input receivers includes at least one of a belt bearing, a gear, and a sprocket.

According to another example ("Example 4"), further to Example 1, the plurality of input members are reconfigurable relative to the common axle.

According to another example ("Example 5"), further to Example 4, the plurality of input receivers are removable from and addable to the common axle.

According to another example ("Example 6"), further to Example 1, the first exercise attachment includes a stationary bicycle and the second exercise attachment includes an elliptical machine, the elliptical machine being stowable.

According to another example ("Example 7"), further to Example 1, the modular exercise apparatus further comprises a third exercise attachment including a third drive member operably coupled to a third input receiver of the plurality of input receivers of the common drivetrain.

According to one example ("Example 8"), a drivetrain for a modular exercise machine including a plurality of attachments is provided, the drivetrain comprising a frame, a common axle supported by the frame, a first input receiver operably coupled to the common axle, the first input receiver operable to couple with a first attachment of the plurality of attachments, a second input receiver operably coupled to the common axle, the second input receiver operable to couple with a second attachment of the plurality of attachments, and a resistance member supported by the frame and operably coupled to the common axle to provide resistance against rotation of the common axle.

According to another example ("Example 9"), further to Example 8, the first input receiver is operable to engage the common axle when rotating a first direction and wherein the first input receiver is operable to rotate relative to the common axle when rotating a second direction.

According to another example ("Example 10"), further to Example 8, the drivetrain further comprises an output member coupled to the common axle and operably coupled to the resistance member such that resistance by the resistance member is applied to the common axle via the output member.

According to another example ("Example 11"), further to Example 10, the common axle is supported by the frame at a first position and the resistance member is supported by the frame at a second position.

According to another example ("Example 12"), further to Example 8, at least one of the first and second input receivers includes at least one of a belt bearing, a gear, and a sprocket.

According to another example ("Example 13"), further to Example 8, the first and second input receivers are removable from and addable to the common axle.

According to another example ("Example 14"), further to Example 8, the drivetrain further comprises a third input receiver operably coupled to the common axle, the third input receiver operable to couple with a third attachment of the plurality of attachments.

According to one example ("Example 15"), a combination exercise device is provided, the combination exercise device comprising a stationary bicycle attachment including a stationary bicycle drive member having a first receiver member operable to receive a first mechanical user input and a first output member for transmitting the first mechanical user input, an elliptical exercise attachment including an elliptical exercise drive member having a second receiver member operable to receive a second mechanical user input and a second output member for transmitting the second mechanical user input, the second receiver member and the second output member each being separate from the first receiver member and the first output member a common axle operably coupled to the stationary bicycle drive member to receive the first mechanical user input from the stationary bicycle attachment and operably coupled to the elliptical exercise drive member to receive the second mechanical user input from the elliptical exercise attachment, and a resistance member operably coupled to the common axle and operable to provide mechanical resistance against the first mechanical user input and the second mechanical user input.

According to another example ("Example 16"), further to Example 15, the elliptical exercise attachment is stowable.

According to another example ("Example 17"), further to Example 16, the elliptical exercise drive member further includes a first axle, a first bearing operably coupled to the first axle, a second axle, a second bearing coupled to the second axle, a belt operably coupling the first bearing and the second bearing, and a first gear coupled to the second axle, the first gear operable to transmit the second mechanical user input to a second gear coupled to the common axle, the elliptical exercise drive member maintaining predetermined tensioning on the belt when the elliptical exercise attachment in an operational configuration and in a stowed configuration.

According to another example ("Example 18"), further to Example 16, the elliptical exercise attachment includes linkage units selectively changeable between a fixed configuration and a non-fixed configuration, wherein the linkage units are in the fixed configuration when the elliptical exercise attachment is in an operational configuration and the arms are in the non-fixed configuration when the elliptical exercise attachment is being transitioned to a stowed configuration.

According to another example ("Example 19"), further to Example 15, the combination exercise device further comprises a rower exercise attachment including a rower drive member having a third receiver member operable to receive a third mechanical user input and a third output member for transmitting the third mechanical user input, the third receiver member and the third output member each being separate from the first and second receiver members and the first and second output members.

According to another example ("Example 20"), further to Example 19, the rower exercise attachment is stowable.

According to one example ("Example 21"), a combination exercise device is provided, the combination exercise device comprising a stationary bicycle attachment defined along a longitudinal axis, the stationary bicycle attachment operable to position a user in a first direction along the longitudinal axis when in use, an elliptical exercise attachment defined along the longitudinal axis, the elliptical exercise attachment operable to position a user in a second direction along the longitudinal axis when in use, and a common resistance member operable to provide resistance to mechanical user input from the stationary bicycle attachment and the elliptical exercise attachment.

According to one example ("Example 22"), a combination exercise device is provided, the combination exercise device comprising an elliptical exercise attachment including a stowable linkage member, a rower machine attachment including a stowable seat member, and a common resistance member operable to provide resistance to mechanical user input from the elliptical exercise attachment and the rower machine attachment.

According to one example ("Example 23"), an elliptical exercise device is provided, the elliptical exercise device comprising a frame, a drivetrain supported by the frame, the drivetrain including a first axle, a first crank coupled to the first axle, and a second crank coupled to the first axle, a resistance member supported by the frame and operably coupled to the drivetrain, and a plurality of linkage units each coupled to the frame and to a corresponding crank of the first and second cranks, each linkage unit including a first portion having a rotatable coupling member coupled to the corresponding crank, a second portion defining a first position, a second position, and a third position, the second portion hingedly coupled to the frame at a first position, a third portion hingedly coupled to the second portion at a third position, the first portion hingedly coupled to the second portion at a second position that is between the first and third positions, the third portion including a foot pad and the third portion operable to interface with the rotatable coupling member such that the third portion moves relative to the coupling member.

According to another example ("Example 24"), further to Example 23, the second portion includes a joint between the third position and the corresponding crank that is selectively hinged, the joint being fixed during use of the elliptical exercise device and moveable for facilitating stowage of the plurality of linkage units.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The accompanying drawings are included to provide a further understanding of the disclosure. The drawings incorporated in and constituting a part of this specification illustrate embodiments of the disclosure, and together with the description, serve to explain the principles of the disclosure, wherein like numerals denote like elements and wherein.

DETAILED DESCRIPTION

Figure 1:
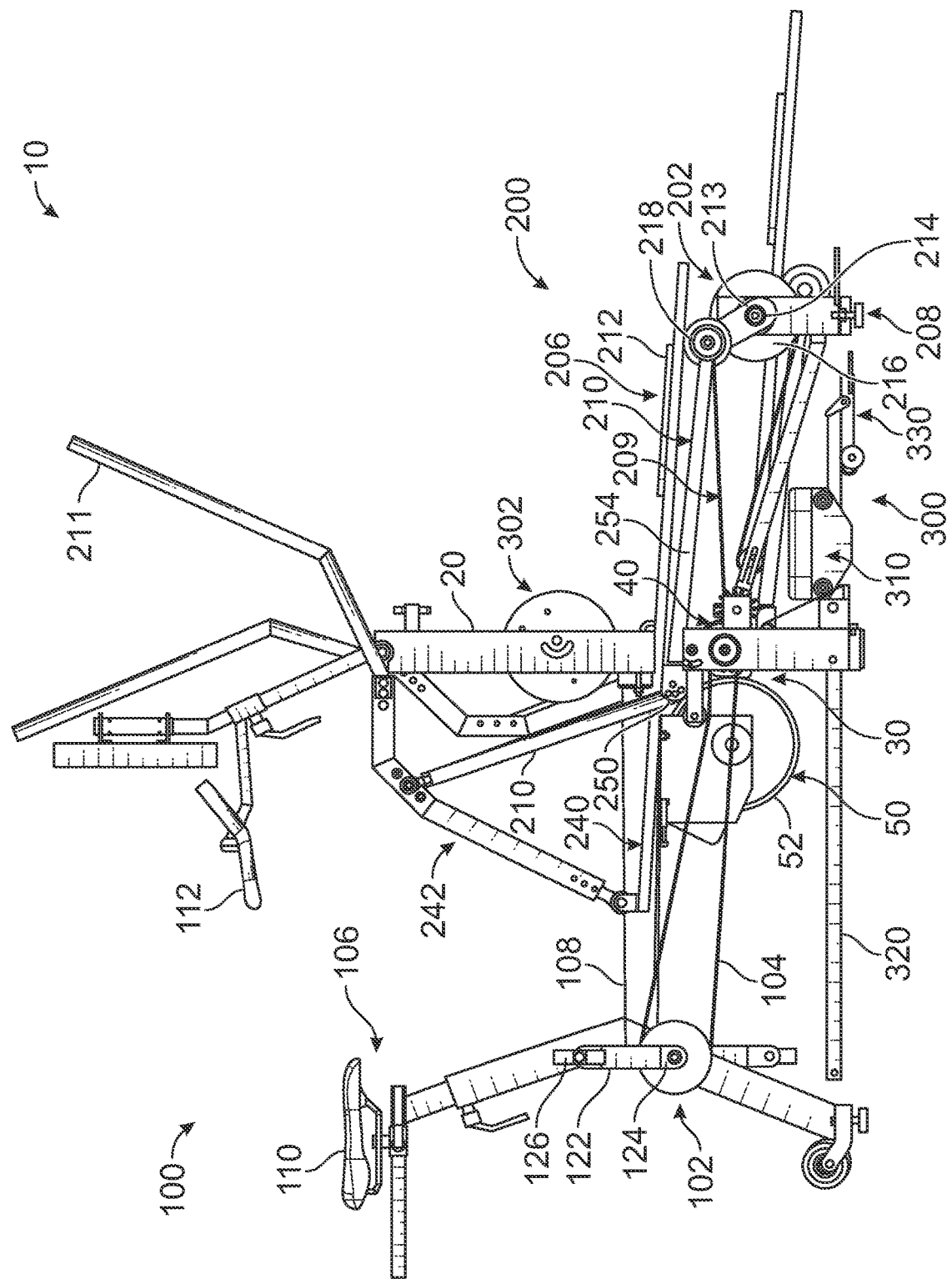
FIG. 1 illustrates a combination stationary exercise machine that is modular, the exemplary machine including a stationary bicycle attachment, an elliptical machine attachment, and a rower machine attachment each operable coupled to a common drivetrain, in accordance with an embodiment of the present disclosure.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

Persons skilled in the art will readily appreciate that various aspects of the present disclosure can be realized by any number of methods and systems configured to perform the intended functions. Stated differently, other methods and systems can be incorporated herein to perform the intended functions. It should also be noted that the accompanying drawing figures referred to herein are not all drawn to scale, but can be exaggerated to illustrate various aspects of the present disclosure, and in that regard, the drawing figures should not be construed as limiting.

FIG. 1 shows an exemplary embodiment of an exercise machine 10 that includes various stationary exercise attachments. The exercise machine 10 is operable to provide a user with various types of methods of exercising targeting various muscles for aerobic and anaerobic exercise. The exercise machine 10 is a resistance and/or endless-path exercise machine. In some embodiments, the exercise machine 10 is a modular machine that can be modified to include various attachments for providing specific workouts for a user. Various attachments may be removed and added to the exercise machine so as to customize the types of activities in which the user engages. The exercise machine is capable of being used in residential, commercial, professional, rehabilitative, or any other setting. Furthermore, the exercise machine 10 is operable to be used both for cardiovascular training as well as strength training.

Referring to FIGS. 1-4, an exemplary exercise machine 10 is illustrated including a stationary bicycle attachment 100, an elliptical machine attachment 200, and a rowing machine attachment 300. These various attachments are given by way of example, however, it is contemplated that any number of different attachments and combinations of attachments is compatible with the exercise machine 10 discussed herein (e.g., stationary skier machine, stationary stepper machine, treadmills, cabled strength, and so forth). The exercise machine 10 includes a frame 20 and a drivetrain 30 (also referred to herein as a common drivetrain). The frame 20 supports the drivetrain 30, and in some embodiments at least a portion of the attachments. The drivetrain 30 includes a transmission 40 (also referred to herein as a common transmission) and a resistance member 50. The transmission 40 is operably coupled to each of the exercise attachments. The transmission 40 is also operably coupled to the resistance member 50. Accordingly, each of the exercise attachments is operably coupled to the resistance member 50 via the transmission 40.

Figure 3:
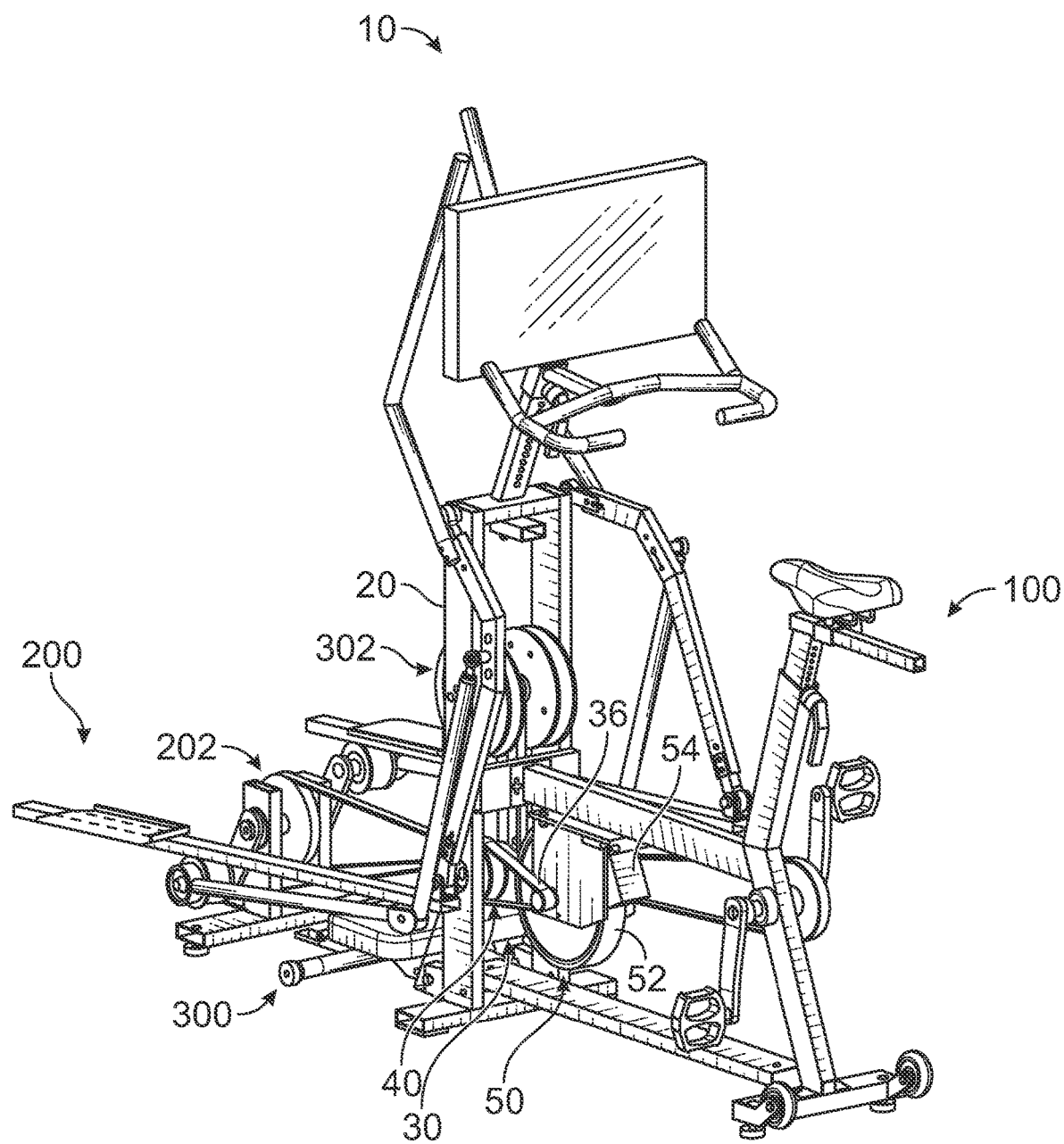
FIG. 3 is an alternative perspective view of the combination exercise machine of FIG. 1 illustrating the common drivetrain including a single resistance member, in accordance with an embodiment of the present disclosure.
Figure 5:
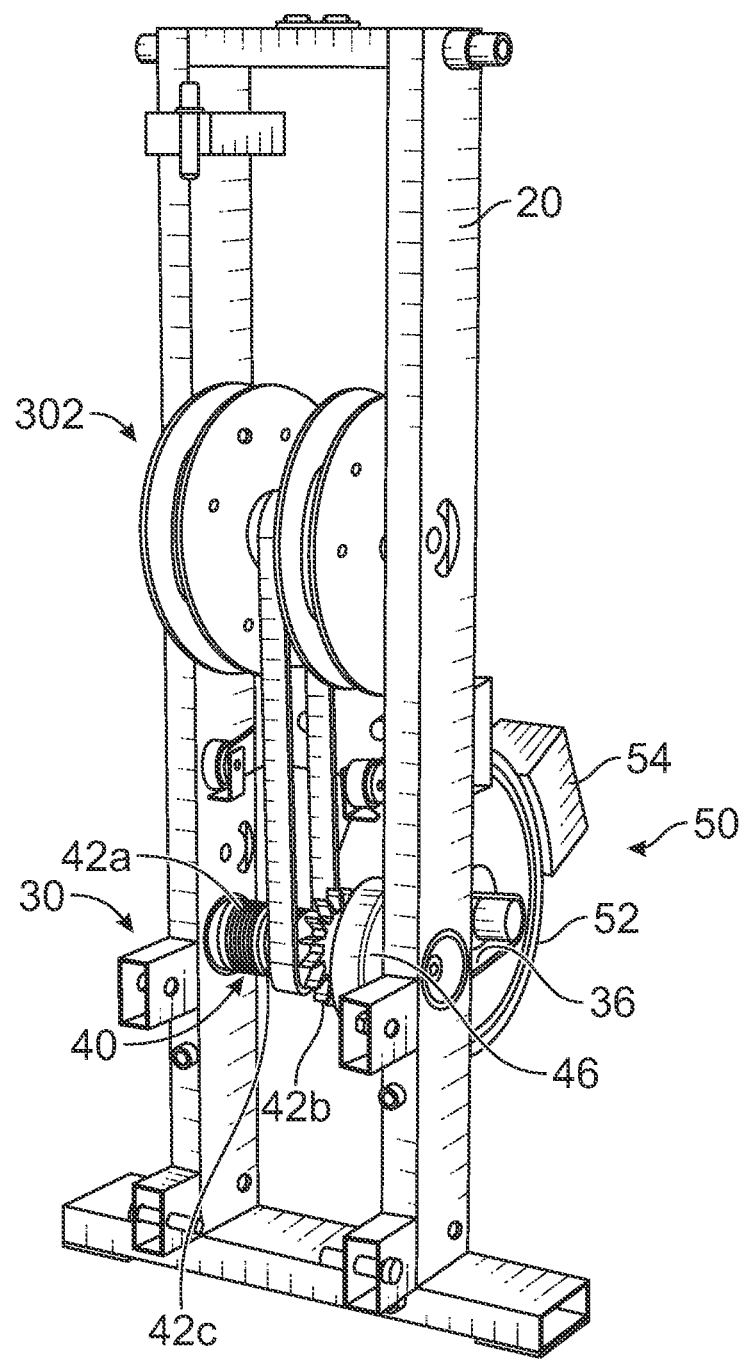
FIG. 5 illustrates a common drivetrain being supported by a frame, the common drivetrain illustrated with a plurality of input receivers for operably coupling various attachments to the common drivetrain, in accordance with an embodiment of the present disclosure.

With reference to FIGS. 3 and 5, the drivetrain 30 is shown supported by the frame 20. The drivetrain 30 includes the resistance member 50 that is coupled to the transmission 40 via a belt 36. The belt 36 is operable to transmit any input received by the transmission 40 from the attachments to the resistance member 50. The resistance member 50, for example, may include a flywheel 52. The flywheel 52 is operable to provide rotational inertia to the exercise machine 10 when the stationary attachments are in use. Furthermore, the resistance member 50 may include a resistive element 54 for providing resistance to motion of the flywheel 52. For example, the resistive element 54 may include a frictional member that contacts the flywheel 52 to impart a force against movement (e.g., rotation) of the flywheel 52. The resistive element 54 may also include a magnetic member that is operable to impart force against movement of the flywheel 52. As flywheels are well known in the art, and are therefore not described further for the sake of brevity. Whether the resistance member 50 is mechanical, electromechanical, electromagnetic, pneumatic, hydraulic, inertial, air, or any other type of resistance member 50 that include embodiments implementing frictional, magnetic, or any other form of resistance, the user may control the resistance applied by the resistance member 50. For example, the user may select specific resistance profile based on the attachment that is being implemented (e.g., stationary bicycle profile). Furthermore, each attachment may include sub-profiles within an attachment profile for different exercises (e.g., climb sub-profiles, distance sub-profiles, and so forth within a stationary bicycle profile).

Although the resistance member 50 is shown as operably coupled to the transmission 40 by a belt 36 in FIG. 3, it is within the scope of this disclosure that any coupling member may be implemented, such as a chain, driveshaft, and so forth. In FIG. 3, the resistance member 50 is shown as spaced from the transmission 40 such that the transmission 40 may receive input from a greater number of attachments without being restricted spatially by the resistance member 50. However, it is also within the scope of the disclosure that the resistance member 50 and the transmission 40 may be coupled directly together and therefore may not require a coupling member.

Referring again to FIGS. 1-4, the drivetrain 30 can be operably coupled to multiple attachments simultaneously. Thus, the exercise machine 10 is not only modular such that various attachments may be used with the common drivetrain 30, but more than one attachment may be simultaneously coupled to common drivetrain 30. As seen in FIGS. 1-4, the exercise machine 10 includes a stationary bicycle attachment 100, an elliptical machine attachment 200, and a rowing machine attachment 300 each simultaneously and operably coupled to the common drivetrain 30.

Figure 2:
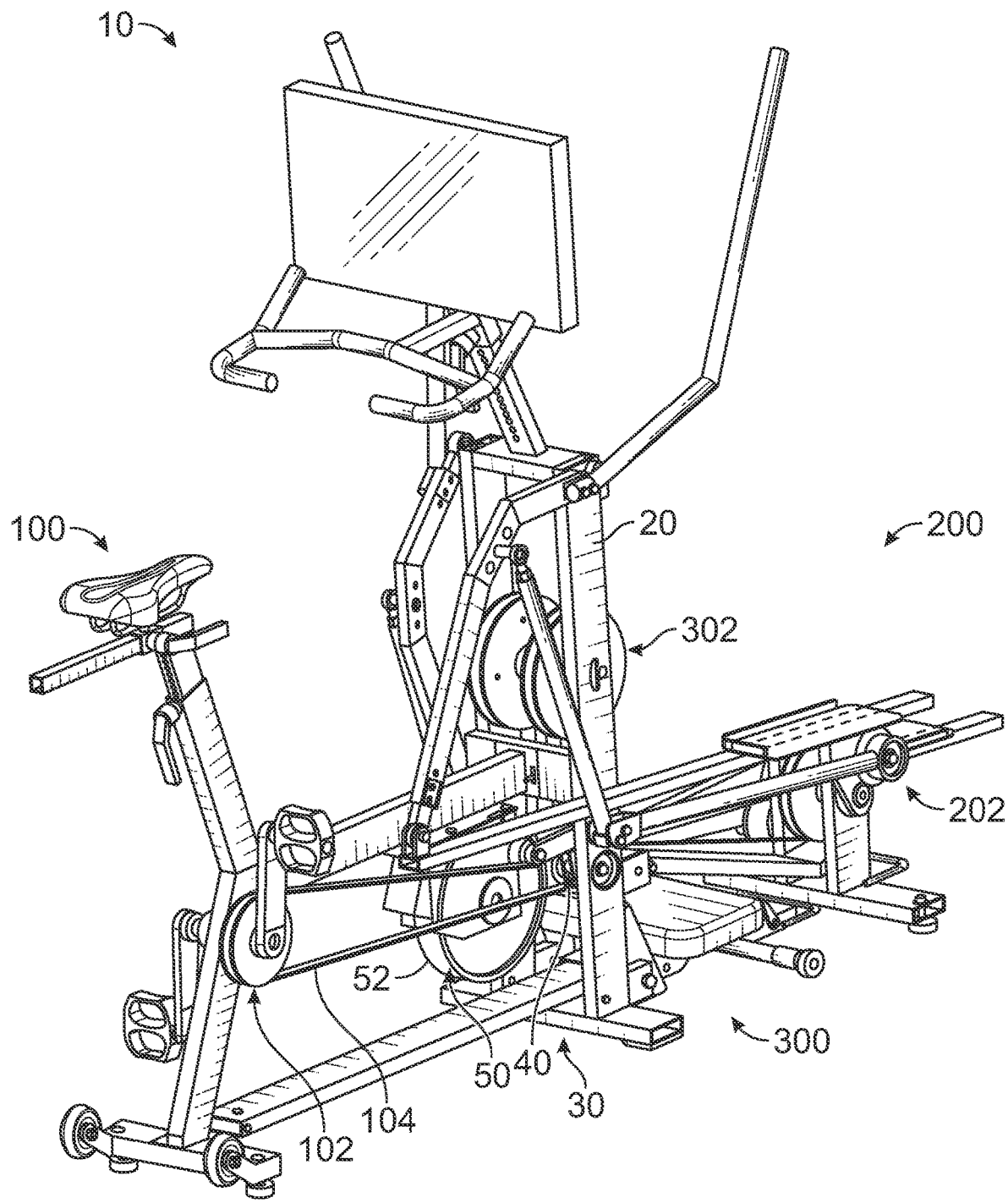
FIG. 2 is a perspective view of the combination exercise machine of FIG. 1, in accordance with an embodiment of the present disclosure.

For example, as illustrated in FIG. 2, the bicycle attachment 100 is shown operably coupled to the common drivetrain 30 via a bicycle drive member 102. The bicycle attachment 100 includes a power transmission member 104 (e.g., a belt) extending between the stationary bicycle attachment 100 and the common drivetrain 30. User input received by the stationary bicycle attachment 100 is translated to the common drivetrain 30 via the bicycle drive member 102. Resistance to the user input can be applied by the resistance member 50 of the common drivetrain 30 which is then translated back to the user via the power transmission member 104 and bicycle drive member 102. Although the bicycle drive member 102 is shown as a belt, any number of drive members may be used including chains, drive rods, belts, and so forth.

Figure 4:
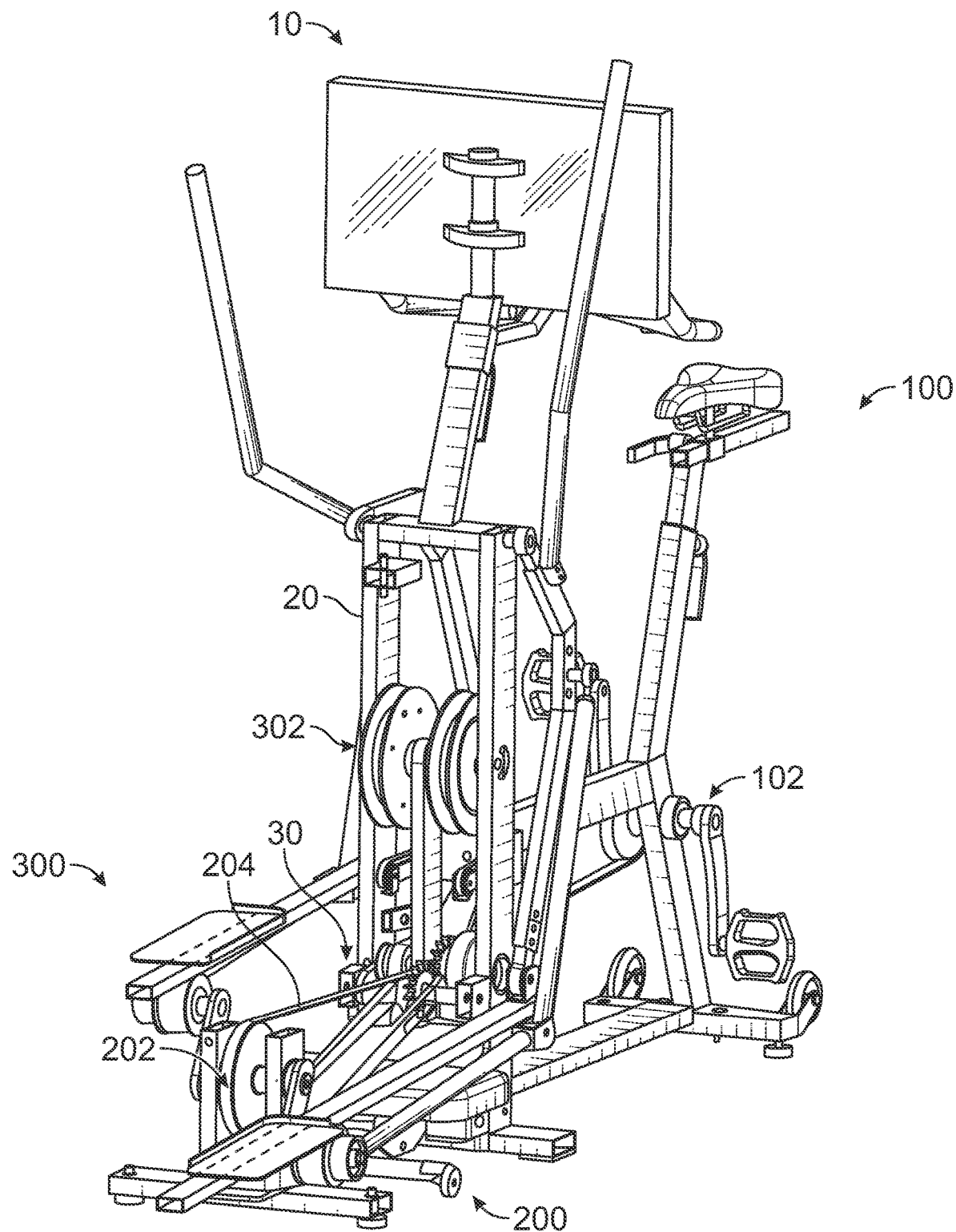
FIG. 4 is another alternative perspective view of the combination exercise machine of FIG. 1, in accordance with an embodiment of the present disclosure.

In another example, as illustrated in FIG. 4, the elliptical attachment 200 including an elliptical machine attachment drive member 202 is shown operably coupled to the common drivetrain 30 via an elliptical machine power transmission member 204. Similar to the bicycle attachment 100, the elliptical attachment 200 is operable to transmit user input to the common drivetrain 30 which in turn is operable to transmit resistance against user input via the elliptical machine power transmission member 204. FIG. 4 illustrates an elliptical machine drive member 202 and an elliptical machine power transmission member 204 which is discussed in greater detail hereafter. However, any number of power transmission members may be used including chains, drive rods, belts, and so forth.

In another example, as illustrated in FIGS. 1 and 4, a rower attachment 300 is shown operably coupled to the common drivetrain 30 via a rower drive member 302. Similar to the bicycle attachment 100 and the elliptical attachment 200, the rower drive member 302 is operable to transmit user input to the common drivetrain 30 which in turn is operable to transmit resistance against user input via the rower drive member 302. The rower drive member 302 will be described in greater detail hereafter, but it is appreciated that any number of drive members may be used including chains, drive rods, belts, and so forth.

It is understood that any number or type of attachments could be operably coupled to the common drivetrain. For example, attachments or systems such as shown in U.S. patent application Ser. No. 16/048,770, filed on Jul. 30, 2018 by Joseph Prosnitz, and U.S. patent application Ser. No. 15/136,560, filed on Apr. 22, 2016 by Joseph Prosnitz, now U.S. Pat. No. 10,039,953, could be incorporated onto the system, the disclosures of which are incorporated herein by reference in their entireties.

Each of the attachments 100, 200, 300 shown in FIGS. 1-4 have separate drive members 102, 202, 302 that are operably coupled to the common drivetrain 30. Thus, each of the attachments 100, 200, 300 is simultaneously operably coupled to the common drivetrain 30. A user may operate any one of the attachments 100, 200, 300 while the remaining attachments are still operably coupled to the drivetrain 30. The user may than change which attachment to utilize without changing or swapping out attachments. It is understood that multiple attachments may be simultaneously operably coupled to the common drivetrain 30 as well as the exercise machine 10 being able to accommodate, add, or remove other attachments that can be selected by a user based on the desired workout, allowing the exercise machine to be reconfigurable to suit various needs and exercises.

Figure 6A:
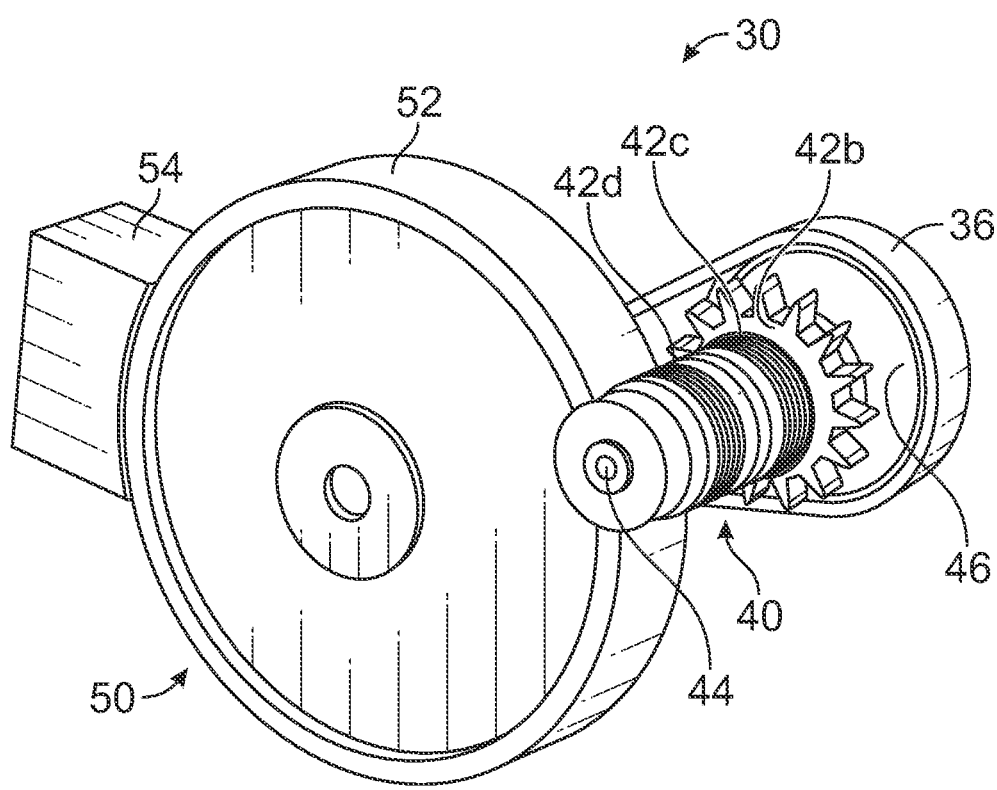
FIGS. 6A and 6B illustrate the common drivetrain including a common axle with a plurality of input receivers and a resistance member including a flywheel and a resistive element, the common axle and the resistance member operatively coupled, in accordance with an embodiment of the present disclosure.
Figure 6B:
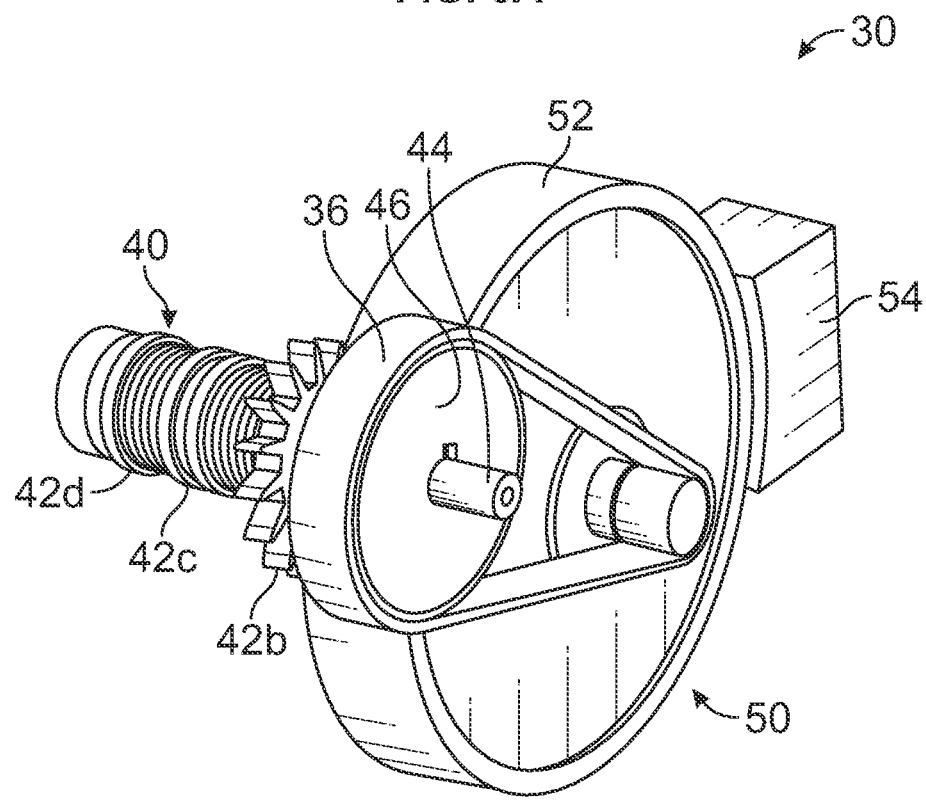

Referring now to FIGS. 5, 6A, and 6B, the common drivetrain 30 is illustrated in more detail. FIG. 5 shows the common drivetrain 30 being supported by the frame 20. More specifically, the common drivetrain 30 includes the common transmission 40 and the resistance member 50. The common transmission 40 is supported in a position such that the various attachments (e.g., attachments 100, 200, 300 of FIGS. 1-4) have access to the common transmission 40, allowing the attachments to be mechanically and operably coupled to the common transmission.

In some embodiments, and as shown in FIGS. 6A and 6B, the common transmission 40 includes a plurality of coupling members 42 and an axle. The coupling members 42 may be positioned about the axle 44. The coupling members 42 may be engaged to the axle 44 in a variety of engagements, including but not limited to, permanent, adjustable, modular, one-way, two-way, and so forth. Each coupling member 42 is operable to receive user input transmitted from the attachment that the user is using and transmit that user input to the axle 44. FIG. 5 illustrates the common transmission 40 operably coupled to a rower drive member 302. Each of the coupling members 42 may be included on the common transmission 40 to be specifically paired with an attachment. For example, the common transmission 40 may include a stationary bicycle coupling member 42a, an elliptical machine coupling member 42b, and a rower coupling member 42c, each positioned about the axle 44. The coupling member 42 may also be universal such that a variety of attachments may be operably coupled to the common drivetrain 30 via the universal coupling member. Each coupling member 42 may be implemented with various properties (e.g., surface for different coefficients of friction, radius, and so forth) to accommodate different attachments. For example, one coupling member 42 may require a first radius and a second coupling member 42 may require a second radius that is different than the first radius in order to accommodate gearing ratios of a specific attachment.

The coupling members 42 may include a variety of members including, but not limited to bearings, gears, pulleys, and so forth. For example, FIG. 5 illustrates the common transmission 40 operably coupled to the rower drive member 302 (e.g., a belt extending between the common transmission 40 and the rower drive member 302)

via the rower coupling member 42c. The rower coupling member in this example is a one-way bearing with a surface for receiving the rower power transmission member 304 (e.g., the belt). The rower coupling member 42c is operable to engage the axle 44 when rotated in a first direction while it is operable to rotate relative to the axle 44 when rotated in a second direction. Stated otherwise, the rower coupling member 42c is operable to engage the axle 44 to rotate the common axle 44 when the rower coupling member 42c is engaged in response to user input at the rower attachment 300 and is not engaged by the axle 44 in response to user input at a different attachment (e.g., stationary bicycle attachment 100 or elliptical machine attachment 200) resulting in rotation of the axle 44 (e.g., the stationary bicycle coupling member 42a is engaging and rotating the axle 44 responsive to user input).

With reference to FIGS. 6A and 6B, the common transmission 40 may further includes an output member 46. The output member 46 may be positioned about the axle 44 and is operable to transmit user input from the axle 44 (received from the attachments as previously discussed) to the resistance member 50. The output member 46 is operable to transmit the motion of the axle 44 to the resistance member 50 such that the resistance member 50 may provide resistance against that motion. As previously discussed, in some embodiments the resistance member 50 may be housed on the common transmission 40, and thus an output member 46 may not be necessary as the resistance member 50 applies resistance directly to the common transmission (e.g., the axle 44).

The resistance member 50 may include a flywheel 52 and a resistive element 54. The flywheel 52 may be operable to provide inertial resistance whereas the resistive element 54 may apply frictional, electromagnetic, or other resistance to the system. As resistance members are known, they will not be described in detail for the sake of brevity.

With further reference to FIGS. 6A and 6B, the common drivetrain 30 is illustrated as having a single common axle 44 and a single resistance member 50. It is appreciated that by utilizing a single axle 44 and a single resistance member 50, the envelope or profile of the exercise machine is decreased both from a packaging/shipping perspective and a utilization perspective. By incorporating a single common drivetrain that does not replicate components (e.g., multiple flywheels), the profile of the exercise machine is decreased. Furthermore, the weight of the exercise machine 10 is decreased, which can be a concern in certain buildings, especially those that include floors above ground level or that may need additional structural support. However, it is within the scope of the disclosure that multiple common drivetrains may be implemented in order to accommodate certain functionalities or methods of use. For example, multiple drivetrains may be implemented in order to accommodate multiple users using different attachments simultaneously.

Figure 7:
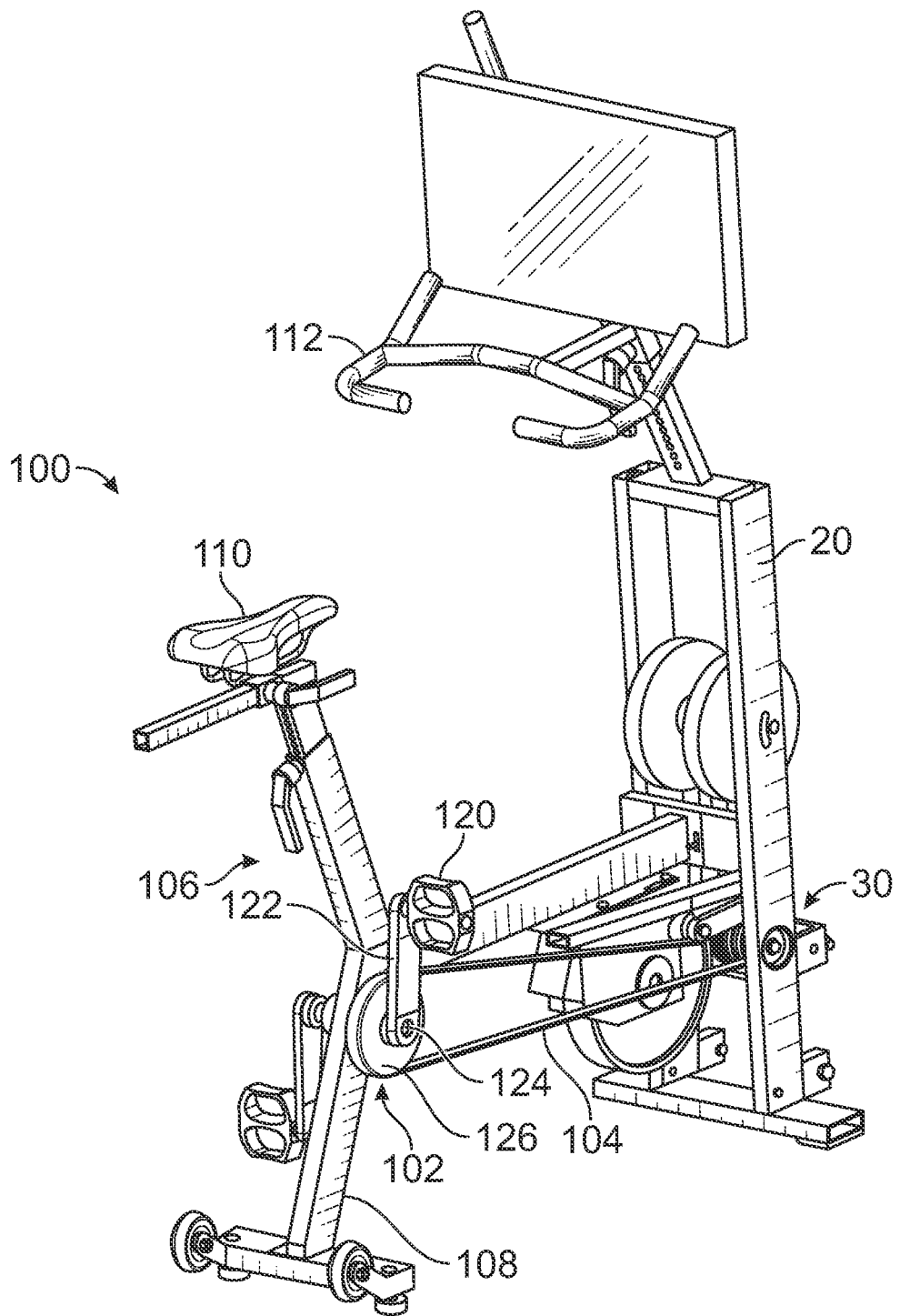
FIG. 7 illustrates a stationary bicycle attachment of a combination exercise machine operably coupled to a common drivetrain, in accordance with an embodiment of the present disclosure.
Figure 8:
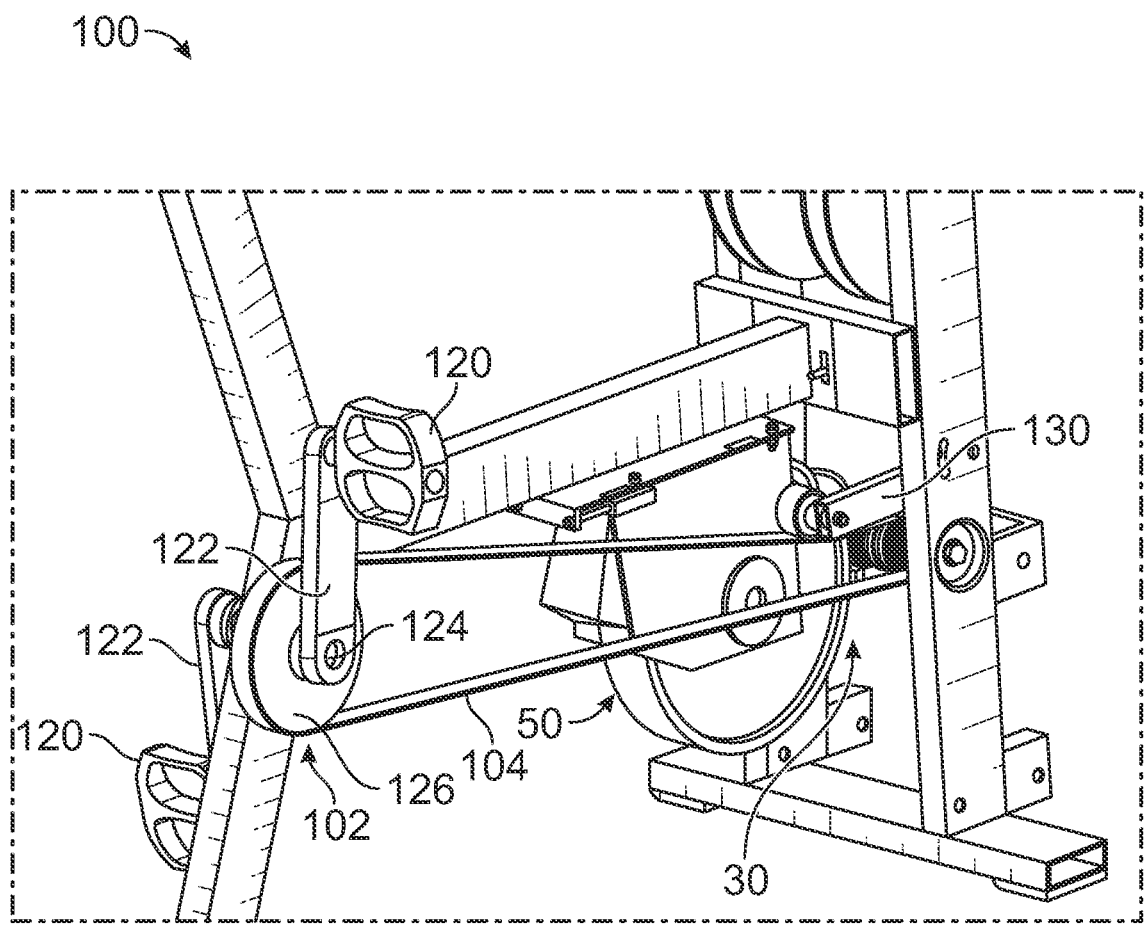
FIG. 8 illustrates a drive member of the stationary bicycle attachment of FIG. 7 operably coupled to the common drivetrain, in accordance with an embodiment of the present disclosure.

Referring now to FIGS. 7-8, a stationary bicycle attachment 100 is illustrated operably coupled to the frame 20 and common drivetrain 30. The bicycle attachment 100 includes a drive member 102, a power transmission member 104, and a user support member 106, and a bicycle attachment frame 108 supporting the user support member 106, the drive member 102, and at least a portion of the power transmission member 104. The user support member 106 is operable to support a user. The user support member 106 includes a seat 110 for supporting a user. The seat 110 may be adjustable in a substantially vertical direction and a substantially horizontal direction, such that the seat may be positioned for various users having different body types. The bicycle attachment 100 may further include handlebars 112, although it is understood that handlebars 112 may be positioned at various other positions on the exercise machine 10, such as supported by the frame 20.

Referring to FIG. 8, the stationary bicycle attachment 100 includes a drive member 102 and a power transmission member 104 that is operable to receive user input and transmit the user input to the common drivetrain 30 of the exercise machine 10. The drive member 102 includes pedals 120, crank arms 122, an axle 124, and a power transmission member receiver 126. Depending on the type of power transmission member 104 implemented, the power transmission member receiver 126 may be selected from a variety of components. For example, when the power transmission member 104 is a belt, the power transmission member receiver 126 may be a bearing with a belt receiving surface. When the power transmission member 104 is a chain, the power transmission member receiver 126 may be a geared sprocket. In some embodiments the bicycle attachment 100 includes a belt tensioner 130.

Referring still to FIG. 8, in some embodiments, the resistance member 50 may be supported on the bicycle attachment 100. In order to provide more positions to which attachments may couple to the common drivetrain 30, the resistance member 50 may be supported on any of the attachments, thus freeing up space on the frame 20 for various other attachments to be operably coupled to the common drivetrain 30. It is noted that the resistance member 50 may be supported on any of the attachments or on the frame 20.

As the drive member 102 receives user input, the power transmission member 104 transmits the user input to the common drivetrain 30. The common drivetrain 30 transmits the user input to the resistance member 50. The resistance member 50 is controlled to provide varying levels of resistance which is then translated back to the user via the common drivetrain 30, the power transmission member 104 and the drive member 102. The resistance member 50 may be controlled manually by the user or may be controlled electronically which will be discussed hereafter. However, it is noted that an electronic controller may be implemented to provide various workouts and ride profiles that can modify the level of resistance for a workout session or during a workout session.

Turning now to a discussion of FIGS. 9-14, an elliptical machine attachment 200 is provided. The elliptical machine attachment 200 is illustrated operably coupled to the frame 20 and common drivetrain 30. The elliptical machine attachment 200 includes a drive member 202, a power transmission member 204, a user support member 206, and an elliptical machine attachment frame 208 supporting the user support member 206, the drive member 202, and at least a portion of the power transmission member 204. The user support member 206 is operable to support a user. The user support member 206 includes support portions 240, 242 for supporting a user and linkage arms 210 (which is described hereafter). The support portions include a foot support portion 240 and a hand support portion 242. The foot support portion 240 may include a foot pad 212 and the hand support portion 242 may include a hand grip 211 with which a user may engage. As the general method and premise of an elliptical machine is well known, for the sake of brevity, the general use is not described herein. It is noted that the user may use the elliptical machine attachment 200 by engaging with the support portion 240 and the hand support portion 242 to actuate the drive member 202. Although any number of configurations of elliptical machine attachments 200 may be implemented, the attachment illustrated in FIGS. 9-13 will be described in more detail.

Figure 9:
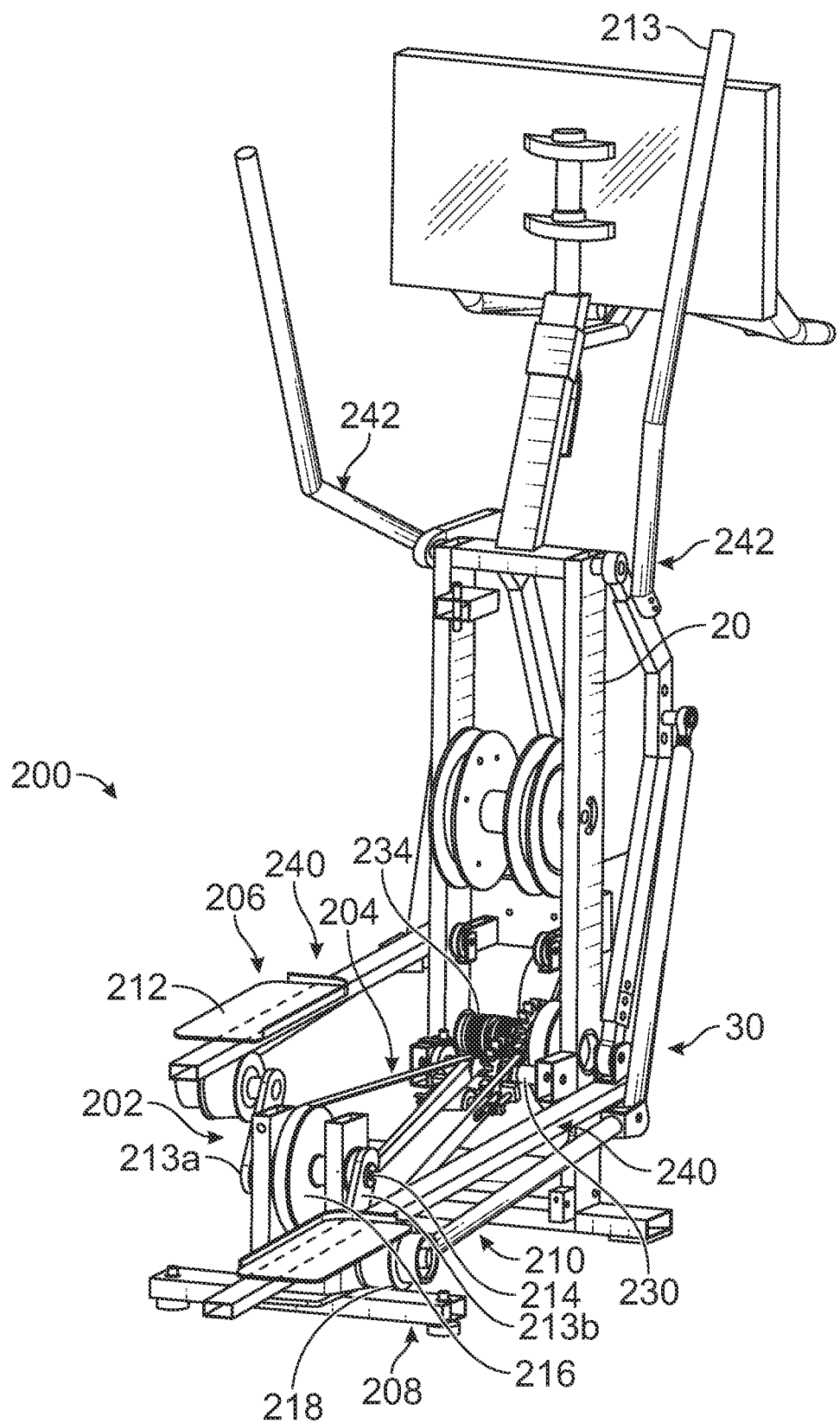
FIG. 9 illustrates an elliptical machine attachment of a combination exercise machine operably coupled to a common drivetrain, in accordance with an embodiment of the present disclosure.

Referring to FIG. 9, the elliptical machine attachment 200 may be a center drive elliptical. For example, the elliptical machine attachment frame 208 supports a drive member 202 that is positioned at or near a longitudinal center of the attachment. The elliptical machine attachment frame 208 extends longitudinally toward frame 20, and, in some embodiments, is coupled to the frame 20. The drive member 202 may be operably coupled to or otherwise in contact with the user support member 206 such that the user support member 206 actuates the drive member 202.

Figure 10:
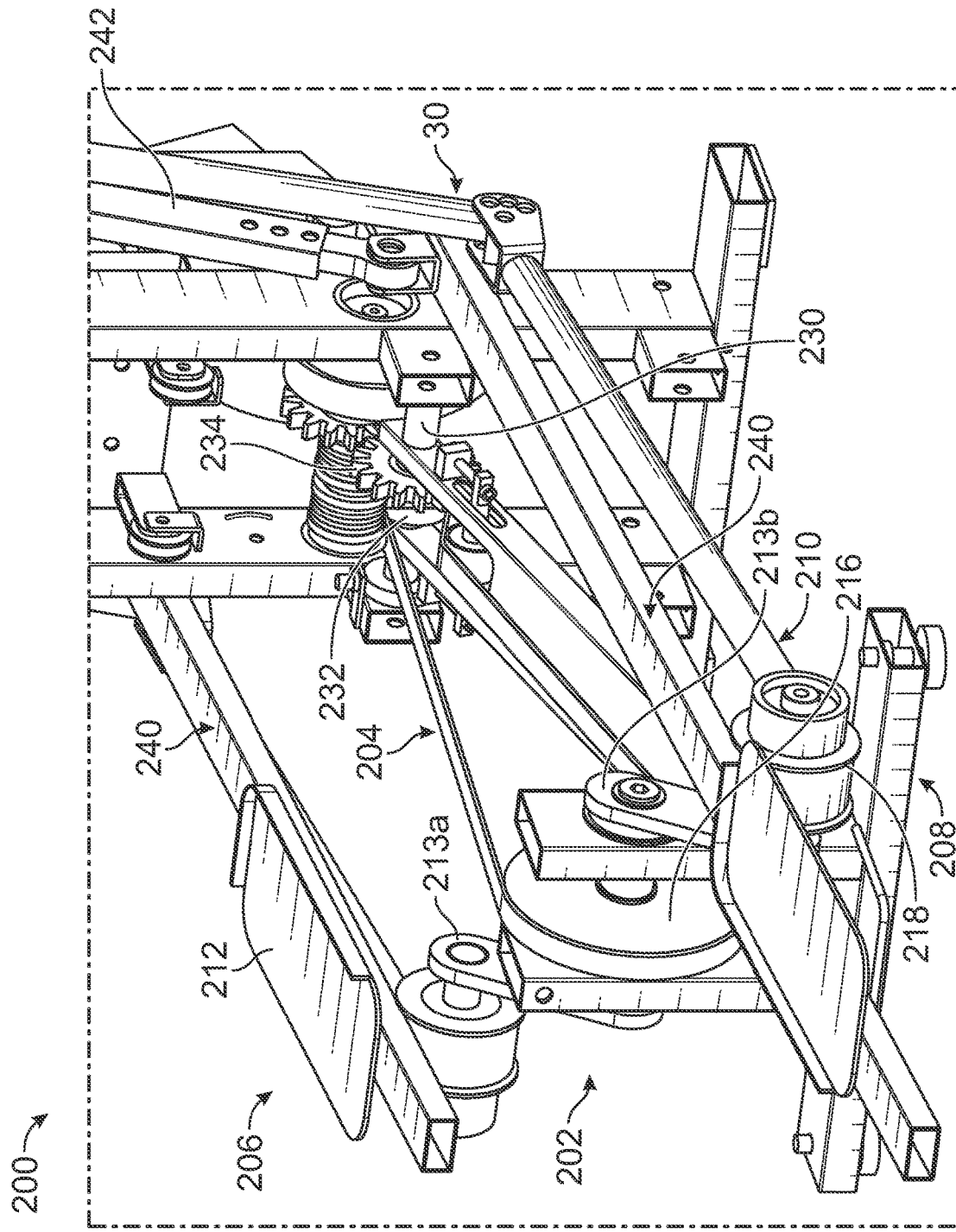
FIG. 10 illustrates a drive member of the elliptical machine attachment of FIG. 9 operably coupled to the common drivetrain, in accordance with an embodiment of the present disclosure.

Referring now to FIG. 10, the interface between the user support member 206 and the drive member 202 is illustrated in further detail. Specifically, the drive member 202 includes first and second crank arms 213a, 213b coupled via an axle 214. A pulley 216 is positioned on the axle 214 and is operable to couple to the power transmission member 204 to transmit user input from the drive member 202 to the power transmission member 204. The crank arms 213 further include interface members 218 that are operable to interface with the user support members 206 such that user input is transmitted from the user support members 206 to the drive member 202. In one example, the interface members 218 includes bearings which are operable to vertically support the user support members 206 while allowing the user support members 206 to translate longitudinally with respect to the interface members 218. Because the crank arms 213 and the drive member 246 rotate and result in a generally circular path of the crank arms 213, the interface members 218 permit the elliptical path of the user's foot by allowing the user support member 206 to travel in a longitudinal direction independent of the drive member 202. It is noted that the drive member 202 and the user support member 206 may take various other forms, such as front drive, rear drive, recumbent, glider, and other elliptical machines with their various drive members.

Referring still to FIG. 10, the power transmission member 204 may include a belt that extends from the pulley 216 of the drive member 202. The power transmission member 204 is operably coupled to the common drivetrain 30. In some embodiments, it may be directly coupled to the common drivetrain 30, for example the belt extends from the pulley 216 of the drive member 202 of the elliptical machine attachment 200 to a pulley on the common drivetrain 30. In other embodiments, the elliptical exercise attachment frame 208 may support further components to transmit user input from the power transmission member 204 to the common drivetrain 30. These further components may allow the elliptical machine attachment 200 to be folded and stowed while still being operable coupled to the exercise machine 10 while maintaining the power transmission member 204 in a functioning configuration (e.g., the belt in a tensioned configuration). This minimizes the risk of the power transmission member 204 from being decoupled or otherwise rendered inoperable during transitions between the active and stowed configurations. For example, the elliptical exercise attachment frame 208 may further support a second axle 230 that is operably coupled to a power transmission receiver 232 (e.g., a pulley, geared sprocket, etc.) that receives the power transmission member 204. The second axle 230 may include intermediate transmission member 234, for example a gear, a pulley, a bearing, or otherwise. The intermediate transmission member 234 is actuated via the second axle 230. As shown in FIG. 10, the intermediate transmission member 234 is a gear which allows the elliptical exercise attachment to pivot about the second axle 230 while still being operable coupled to the exercise machine 10 and while the power transmission member 204 is maintained in an operable configuration (e.g., the belt is still tensioned such that the belt does not disengage from either of the pulleys). As previously mentioned, the common drivetrain 30 includes a plurality of receivers which may be selected to couple to the power transmission members of the attachments. Accordingly, in the embodiment shown in FIG. 10, the common drivetrain includes the coupling member 42b (e.g., a geared receiver).

Figure 13:
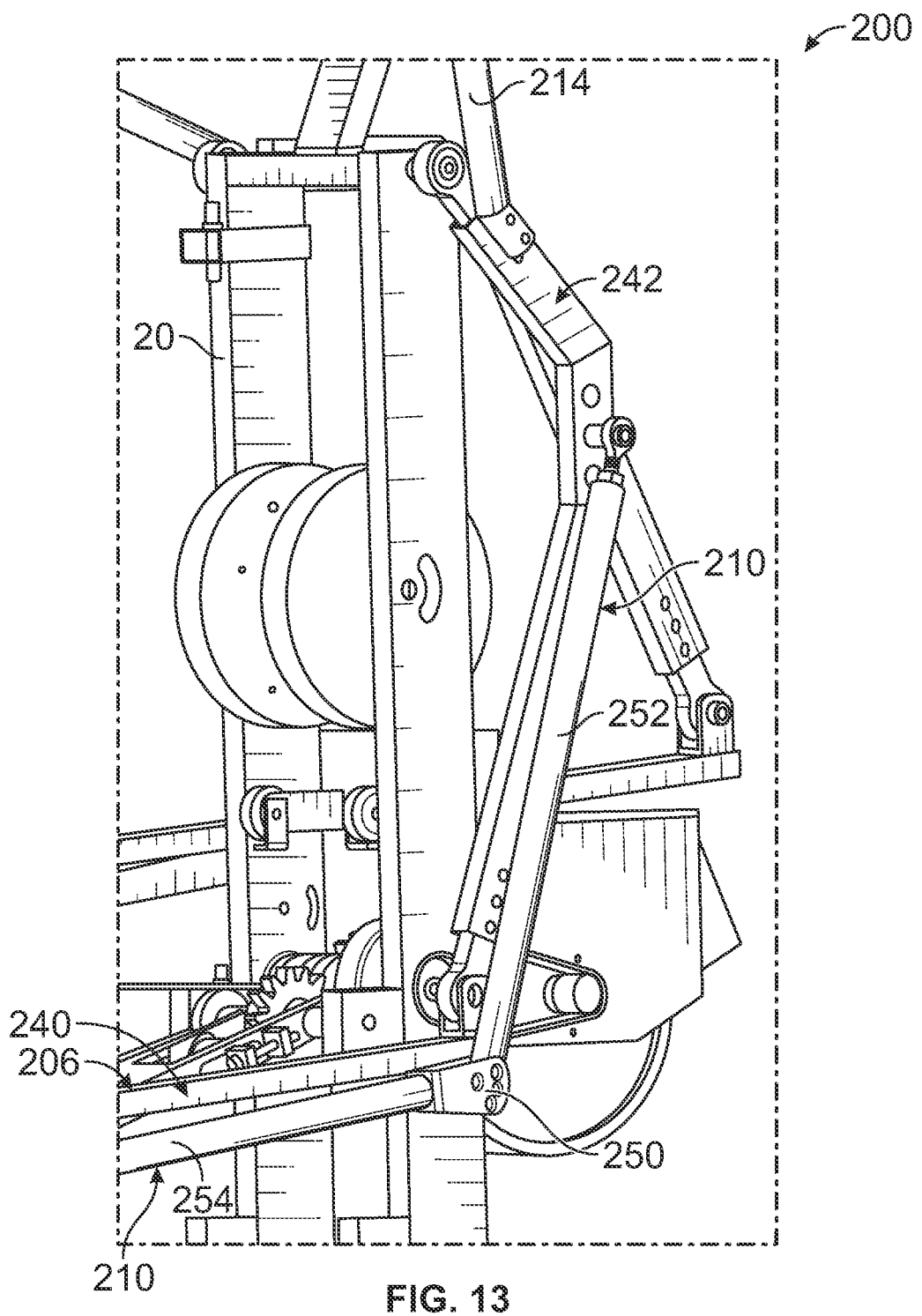
FIG. 13 is an alternative perspective view of the user support members and linkage arms of the elliptical machine attachment of FIG. 9, in accordance with an embodiment of the present disclosure.
Figure 14:
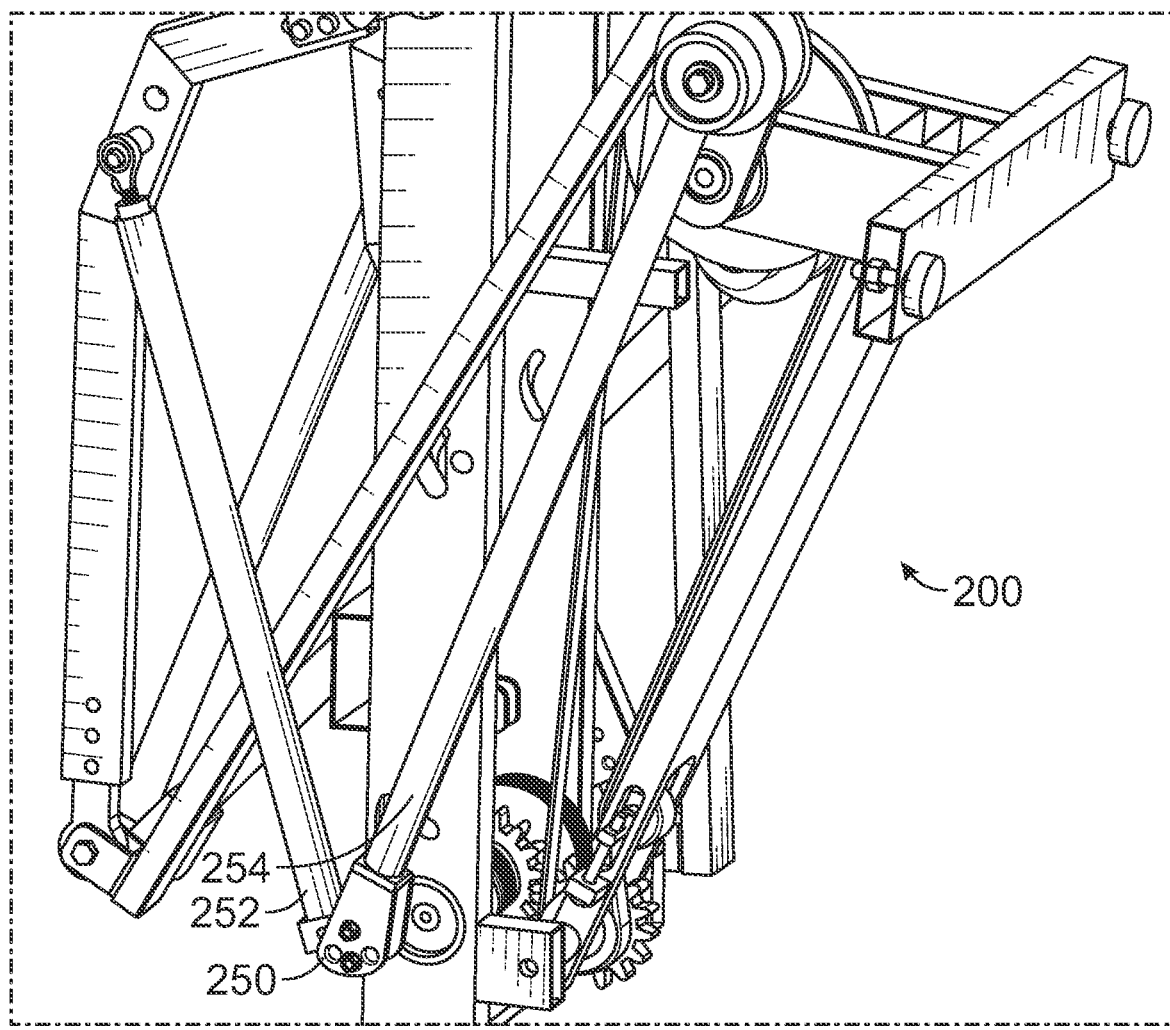
FIG. 14 illustrates linkage arms hinged, allowing the elliptical machine attachment of FIG. 9 to be positioned in a stowed configuration, in accordance with an embodiment of the present disclosure.
Figure 15:
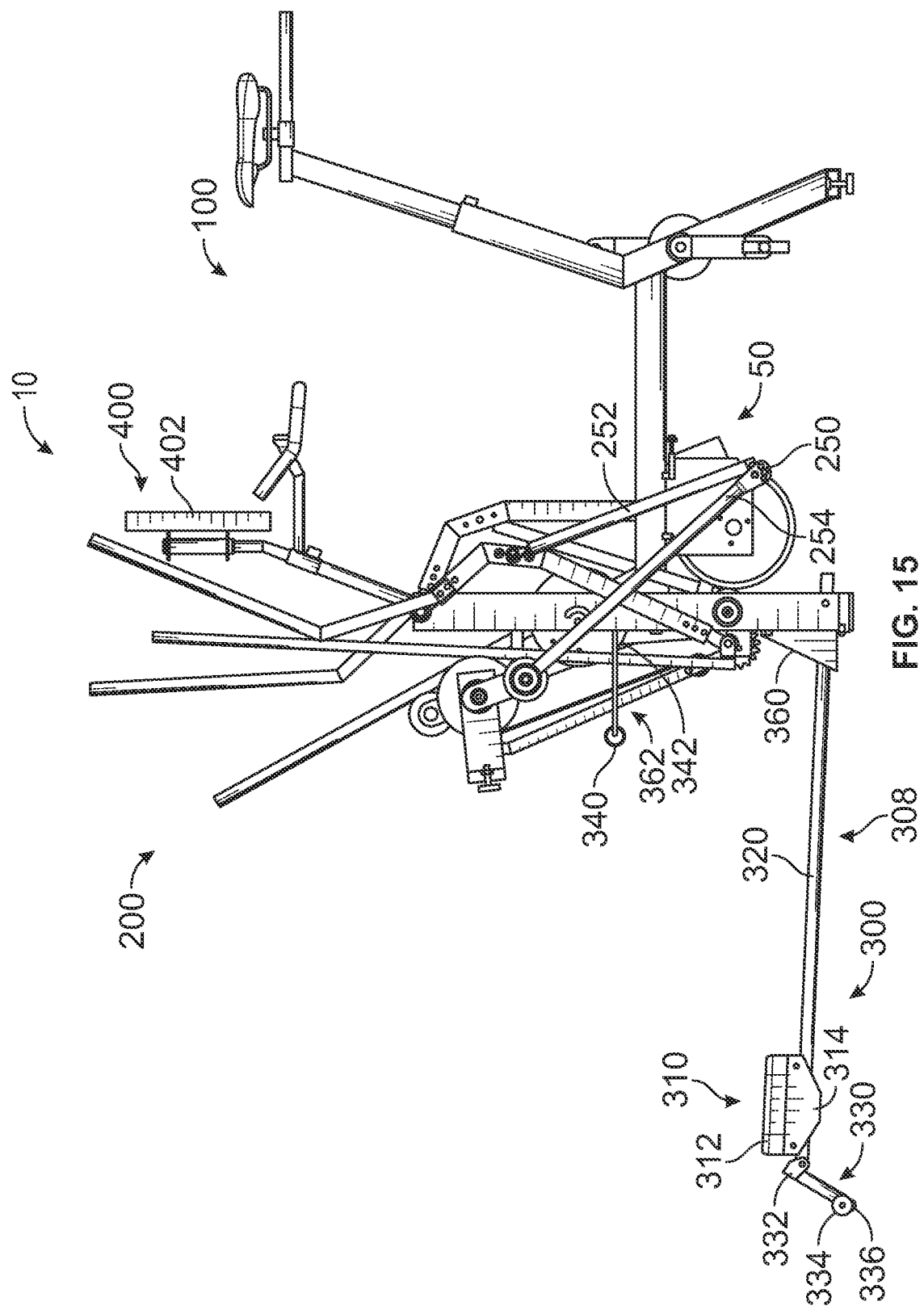
FIG. 15 illustrates a rower attachment of a combination exercise machine operably coupled to a common drivetrain with an elliptical machine attachment in a stowed configuration to provide access to the rower attachment, in accordance with an embodiment of the present disclosure.

As previously mentioned, the elliptical machine attachment 200 may include an operational configuration (e.g., see FIGS. 9-13) and a stowed configuration (see FIGS. 14 and 15). In the operational configuration, the elliptical machine attachment frame 208 is disposed generally longitudinally, and in the stowed configuration, the elliptical machine attachment frame 208 is disposed generally vertically. When in the operation configuration, the elliptical machine attachment frame 208 engages the ground and in the stowed configuration, the elliptical machine attachment frame 208 is supported by the frame 20 of the exercise machine 10.

Figure 11:
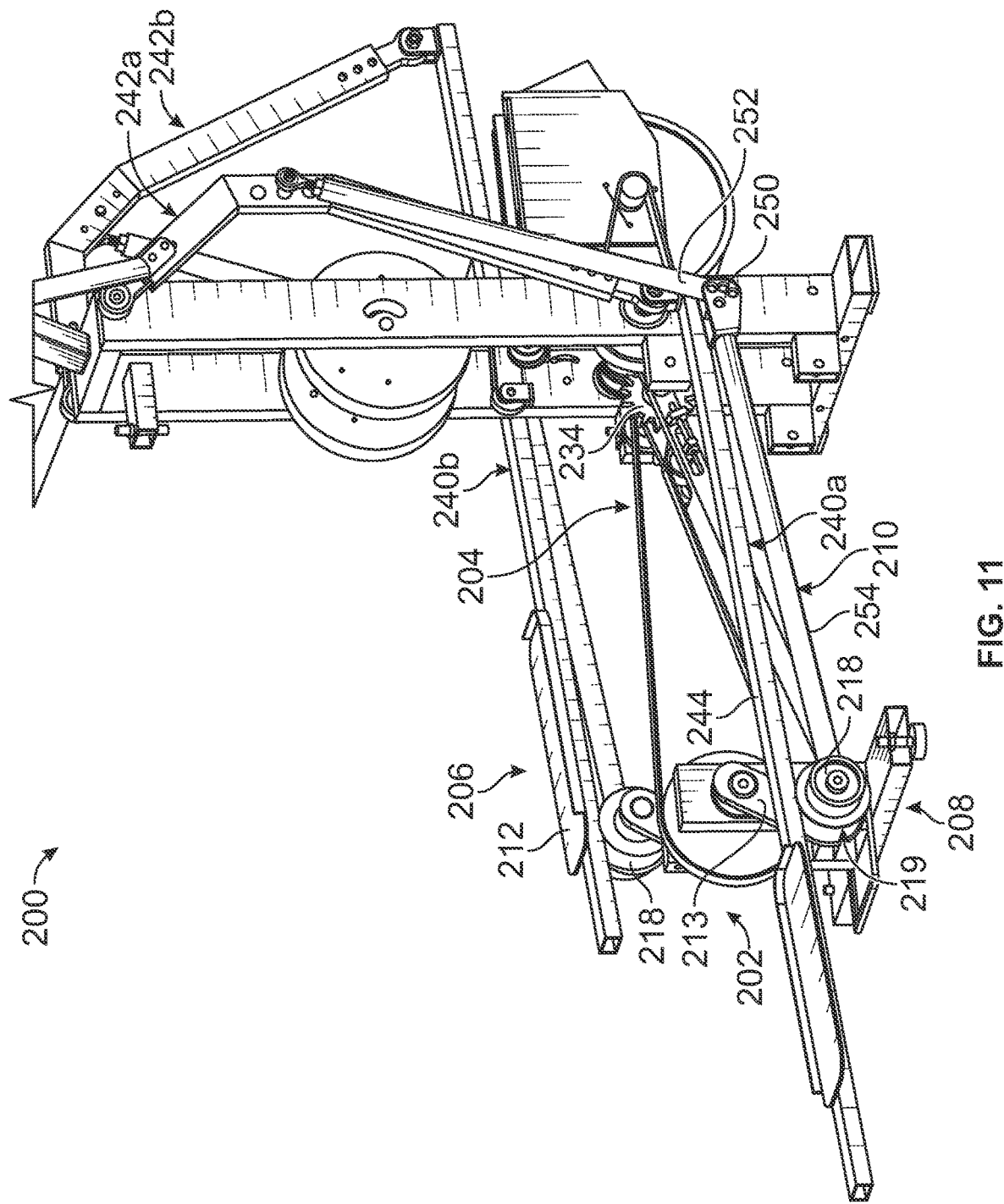
FIG. 11 illustrates an interface of a drive member and user support members of the elliptical machine attachment, in accordance with an embodiment of the present disclosure.

Referring to the operational configuration as illustrated in FIGS. 9-11, as previously discussed, the elliptical machine attachment 200 includes the user support member 206, the drive member 202, the power transmission member 204, the elliptical machine attachment frame 208, and the linkage arms or units 210. As shown in FIG. 10, the user support member 206 includes a foot support portion 240 and a hand support portion 242. The foot support portion 240 may include a foot pad 212 for supporting a user's foot. The hand support portion 242 may include a handlebar 211 which a user may grip during use. The foot support portion 240 and the hand support portion 242 may be coupled to each other. Furthermore. The foot support portion 240 and the hand support portion 242 may be hingedly coupled such that the angle formed between the foot support portion 240 and the hand support portion 242 may vary as the user is exercising on the elliptical machine attachment 200. For example, as seen in FIG. 11, a first foot support portion 240a forms an obtuse angle with a first hand support portion 242a and a second foot support portion 240b forms an obtuse angle with a second hand support portion 242b. As the user support members 206 and the drive member 202 are advanced through the cycle 180 degrees, the first foot support portion 240a forms an acute angle with the first hand support portion 242a and the second foot support portion 240b forms an acute angle with the second hand support portion 242b (not shown).

The user support member 206 is at least partially supported by the drive member 202. For example, as illustrated in FIG. 11, the foot support portion 240 is supported on the interface member 218 of the drive member 202. As previously discussed, the interface member 218 is operable to vertically support the user support member 206 (e.g., the foot support portion 240) while permitting the user support member 206 to horizontally translate along the interface member 218. The hand support member 242 is rotatably couple to the frame 20 of the exercise machine 10. The foot support portion 240 may include a surface that corresponds to the interface member 218 such that the foot support portion 240 is securely maintained and minimizes lateral translation of the foot support portion 240 relative to the interface member. For example, a channel 219 may be formed on the interface member 218 that is operable to receive a rail 244 of the foot support portion 240. Additionally or alternatively, the interface member 218 and the foot support portion 240 may include features such as slots, groves, mono-rails, and so forth.

Figure 12:
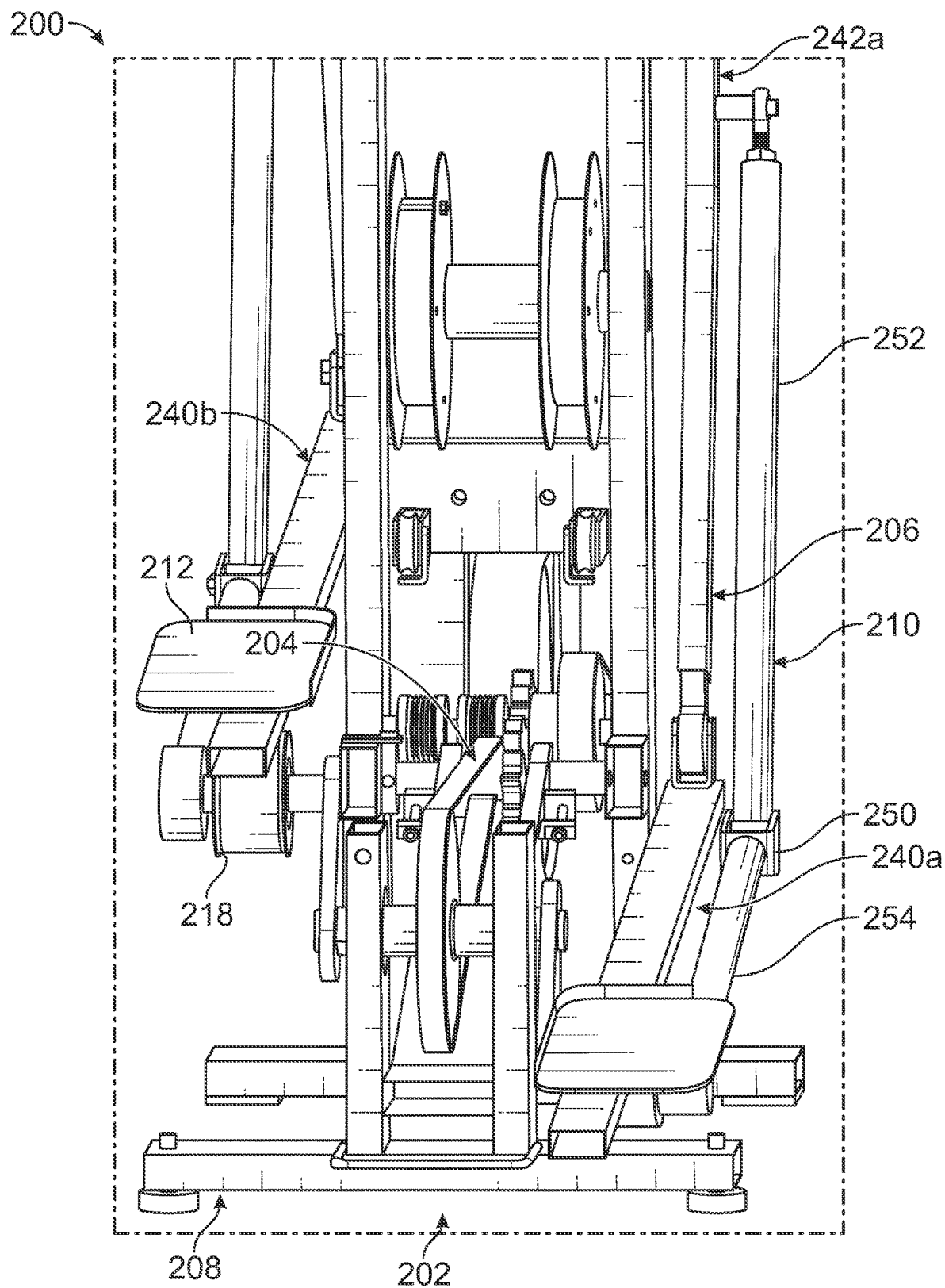
FIG. 12 illustrates user support members and linkage arms of the elliptical machine attachment of FIG. 9, in accordance with an embodiment of the present disclosure.

Referring now to FIGS. 11-13, the elliptical machine attachment 200 includes linkage arms 210 that extend from the drive member 202 to the user support member 206 at a position separate from the interface between the foot support portion 240 and the interface member 218. More specifically, the linkage arm 210 is coupled to the drive member 202 (for example, to the crank arm 213, in a rotating coupling) and to the hand support portion 242. The linkage arm 210 is operable to maintain a predetermined distance between the position at which it couples to the drive member 202 and the position at which it couples to the user support member 206 (e.g., the hand support portion 242). Because the distance is between the two positions is constant, as the hand support portion 242 pivots with respect to the frame 20 at the coupling position, the linkage arm 210 transmits any user input from the hand support portion 242 to the drive member 202. Although the illustrations depict the linkage arm 210 positioned laterally outward from user support member 206, the linkage arm 210 may also be positioned laterally inward from the user support member 206. It is noted that the linkage arm 210 does not interfere with the bending of the user support member 206 (e.g., the pivoting of the foot support portion 240 relative to the hand support portion 242). This facilitates the elliptical motion of the elliptical machine attachment 200.

Turning now to a discussion of the stowed configuration, the elliptical machine attachment 200 may be stowed while still coupled to the exercise machine 10. The stowed profile is operable to reduce the profile or footprint of the exercise machine 10 without detaching the elliptical machine attachment 200 from the exercise machine 10. As previously discussed, the drive member 202 and the power transmission member 204 may be operable to pivot up while remaining coupled to the exercise machine 10. With respect to the pivoting of the elliptical machine attachment frame 208, the frame can be pivotally coupled to the exercise machine 10.

As previously discussed, the linkage arm 210 maintains a predetermined distance between the position at which it couples to the drive member 202 and the position at which it couples to the user support member 206. However, in order to transition the elliptical machine attachment 200 into the stowed position, the linkage arm 210 includes a hinge 250 which allows the linkage arm 210 to be collapsed to during stowage. For example, as illustrated in FIG. 14. The linkage arm 210 includes a first portion 252 and a second portions 254 that are couple to each other via a hinge 250. The hinge 250 allows the first portion 252 and the second portion 254 to pivot relative to each other. The hinge 250 can include features that allow the hinge 250 to be locked into specific configuration. For example, the hinge 250 can include apertures 256 within which pins may be positioned to lock the hinge 250 in a specific configuration. It will be noted that the hinge 250 may be locked at various positions, for example, in a first position in which the elliptical machine attachment 200 is in the operation orientation and a second position in which the elliptical machine attachment 200 is in the stowed configuration. Although the linkage arms 210 are illustrated having selectively lockable hinges, other embodiments are contemplated herein. For example, the linkage arms 210 may be telescoping such that they may be transitioned between first and second configurations that correspond to the operations and stowed configurations of the elliptical machine attachment 200. However, because the linkage arms are operable to selectively maintain a predetermined distance between the attachment points and selectively adjust to a various other distances, the elliptical machine attachment 200 is operable to selectively be stowed in a position to reduce the profile of the elliptical machine attachment 200.

Furthermore, in some embodiments, other attachments may be accessible when the elliptical machine attachment 200 is in the stowed configuration. For example, with reference to FIG. 15, when the elliptical machine attachment 200 is in the stowed configuration, the rower attachment 300 may be accessible. It is noted that any number of attachments may be stowed beneath and accessible with respect to the elliptical machine attachment 200, and the following discussion is only one example of an attachment that can be positioned with respect to the elliptical machine attachment 200 and used when the elliptical machine attachment is in the stowed configuration. For example, FIG. 15 illustrates the elliptical machine attachment 200 in the stowed configuration with a rower attachment 300 in an operational configuration and a stationary bicycle attachment 100 all operably coupled to the frame 20 and the common drive train 30 of the exercise machine 10.

Turning to a discussion of the rower attachment 300, FIG. 15 illustrates the rower attachment 300 in an operational configuration. The rower attachment 300 includes a drive member 302 and a frame member 308. The frame member 308 is operable to support a user and the user's movement while operating the drive member 302. The frame member 308 includes a sliding seat member 310, a longitudinal frame member 320, and a vertical frame member 330. The sliding seat member 310 is operable to slide along the longitudinal frame member 320, the longitudinal frame member 320 may be positioned with and/or coupled to the frame 20 of the exercise machine 10, and the vertical frame member 330 may be positioned to raise the longitudinal frame member 320 to an elevated and/or slanted position.

Figure 16:
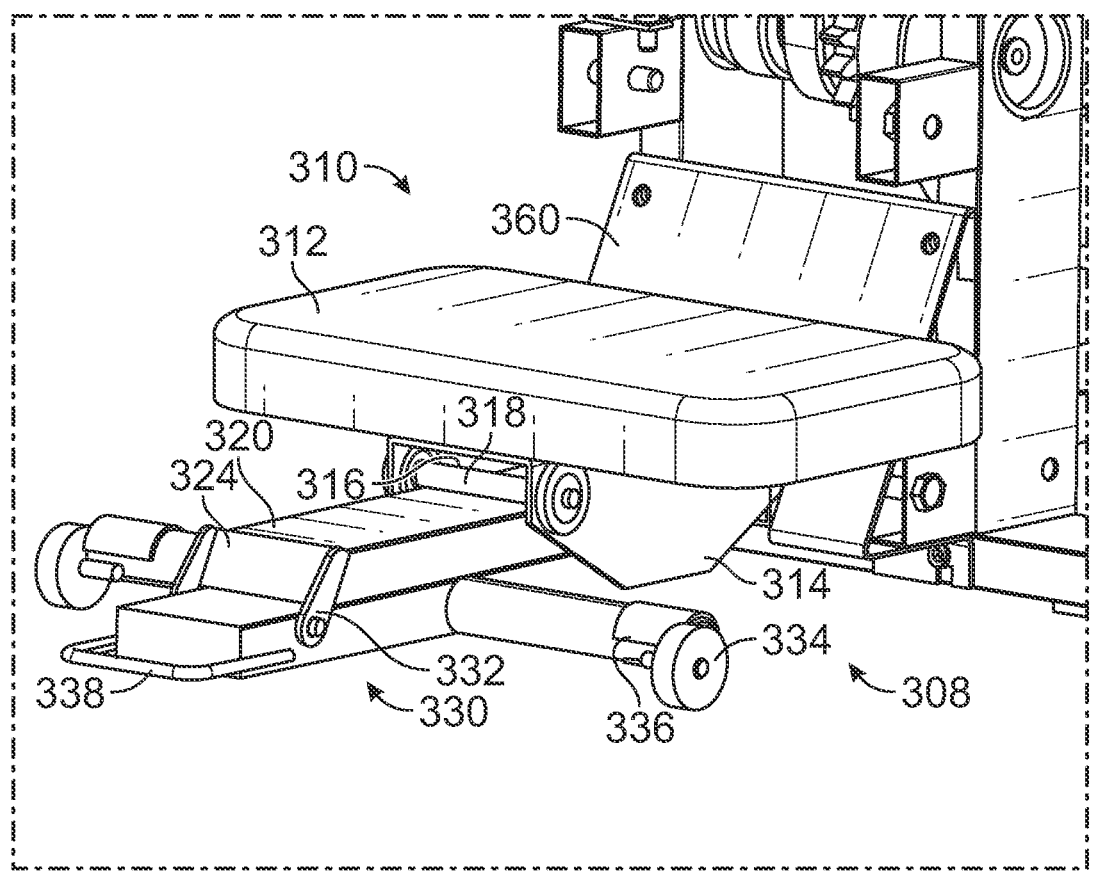
FIG. 16 illustrates the rower attachment of FIG. 15 wherein the rower attachment is in a stowed configuration, in accordance with an embodiment of the present disclosure.

Referring to FIGS. 15 and 16, the sliding seat member 310 includes a seat 312 coupled to a sliding portion 314. The sliding seat member 310 is operable to interface with the longitudinal frame member 320 and slide relative to the longitudinal frame member 320. For example, the sliding portion 314 include a receiver portion 316 that is positioned at least partially around the longitudinal frame member 320 and rollers 318 that are rotatably coupled to the sliding portion 314. The rollers 318 are positioned against the longitudinal frame member 320 such that the rollers facilitate translation of the sliding seat member 310 longitudinally along the longitudinal frame member 320. It is noted that the receiver portion 316 may interface with the longitudinal frame member 320 such that the sliding seat member 310 is constrained from lateral, vertical, and/or rotational movement of the sliding seat member 310 relative to the longitudinal frame member 320.

The longitudinal frame member 320 may also include the vertical frame member 330 to elevate the longitudinal fame member 320 and consequently the sliding seat member 310 from off of the ground. Referring to FIG. 15, the vertical frame member 330 is coupled to the longitudinal frame member 320 at or near one of the ends of the longitudinal frame member 320. The vertical frame member 330 may be disposed at an angle greater than zero relative to a vertical axis to minimize risk of collapse of the frame member 308 to the ground when in use (e.g., when the longitudinal frame member 320 and the vertical frame member 330 are hingedly coupled).

In some embodiments, the longitudinal frame member 320 and the vertical frame member 330 are coupled via a hinge 332 such that the profile of the frame member 308 may be minimized for storage (see FIGS. 16 and 17) by folding the vertical frame member 330 to a collapsed configuration. Furthermore, the vertical frame member 330 may include rollers 334 that engage with the ground when in the collapsed configuration such that the frame member 308 may be moved more easily when in the collapsed configuration. The vertical frame member 330 may also include friction members 336 that engage with the ground and prevent translation of the frame member 308 relative to the ground when in the operational configuration. Thus, the frame member 308 is secure when in the operational configuration and is easily moveable when in the stowed configuration.

The vertical frame member 330 may also include a handle 338 that facilitates transition of the frame member 308 between the stowed and operational configurations. The handle 338 may be positioned relative to the hinge 332 such that the force applied to the handle 338 to lift the frame member 308 to the operational configuration causes the vertical frame member 330 to rotate relative to the longitudinal frame member 320 such that the vertical frame member 330 is operable to support the longitudinal frame member 320. The handle 338 also locates the user's hand away from the pivoting so as to minimize the risk of the user's hand being pinched in the hinge between the two components. As is illustrated in FIGS. 15 and 16, the interface 324 between the longitudinal and vertical frame members 320, 330 may be angled such that once the frame member 308 is in the operational configuration, an obtuse angle is formed between the longitudinal and vertical frame members 320, 330 and the vertical frame member 330 is positioned at an angle greater than zero relative to a vertical axis. This minimizes the risk of the vertical frame member 330 from collapsing unintentionally to the stowed configuration during use, especially in view of the forces exerted by the user when sliding the sliding seat member 310 along the longitudinal frame member 320.

Figure 17:
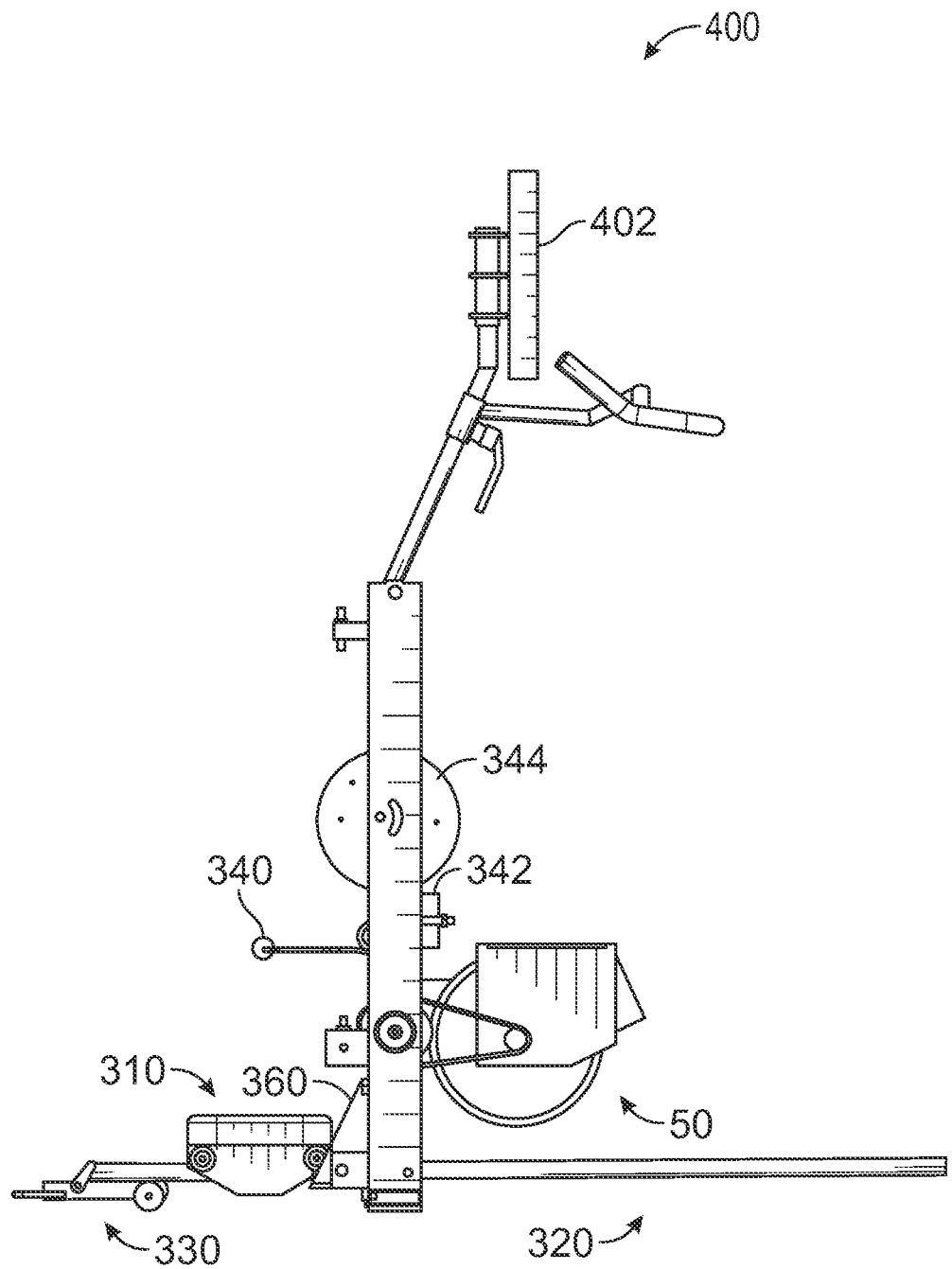
FIG. 17 is an alternative side view of the rower attachment of FIG. 15 wherein the rower attachment is in a stowed configuration, in accordance with an embodiment of the present disclosure.
Figure 18:
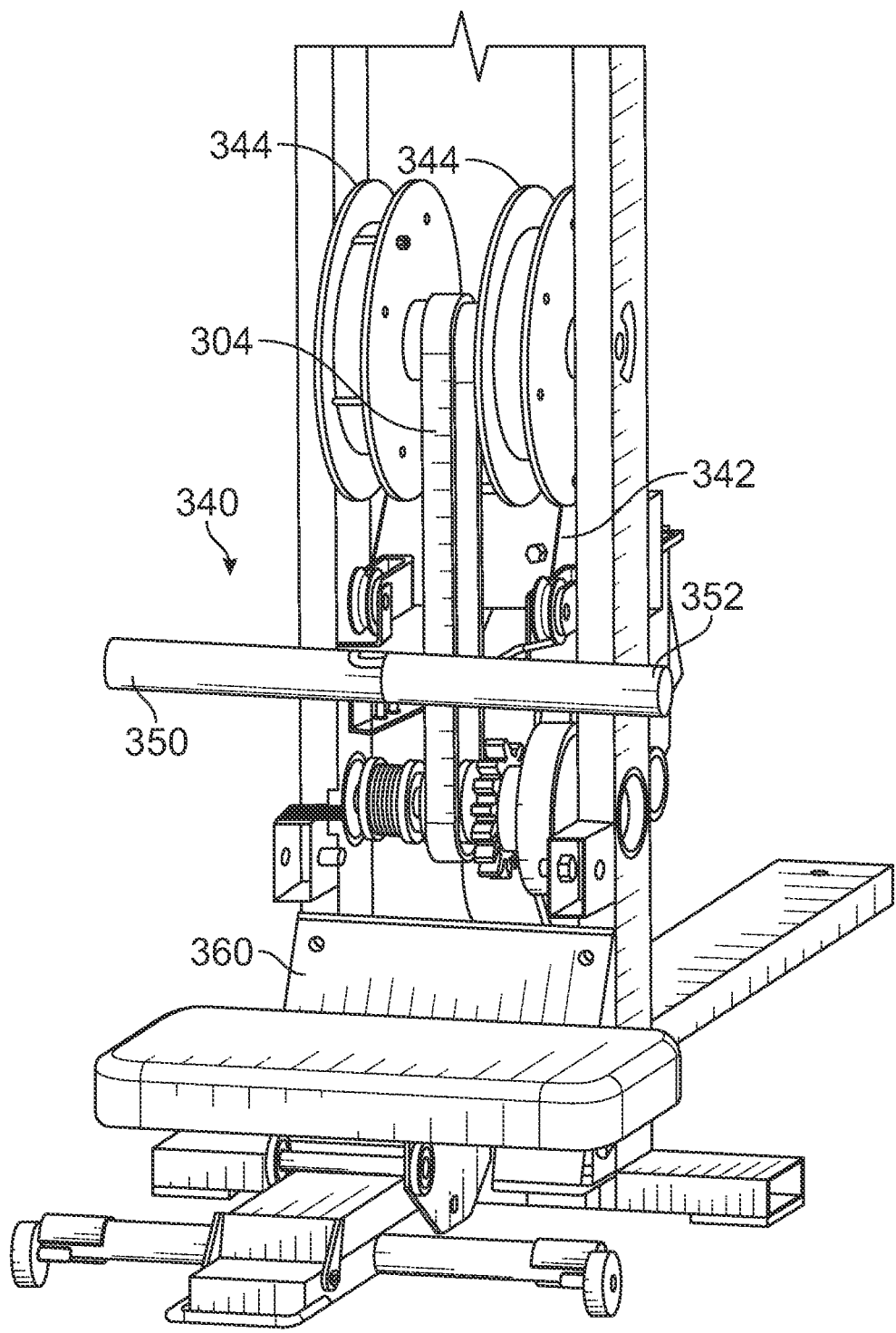
FIG. 18 illustrates a drive member of a rower attachment, in accordance with an embodiment of the present disclosure.

Turning now to a discussion of the drive member 302 of the rower attachment 300, the drive member 302 is illustrated in FIGS. 17 and 18 including handles 340, coupling members 342, and pulleys 344. A user grasps the handles 340 and pulls, causing the coupling members 342 to rotate the pulleys 344 and thus unravel from the pulleys 344. In some embodiments, the pulleys 344 are coupled directly to the common drivetrain 30. In the embodiment illustrated in FIG. 18, the pulleys 344 transmit the user input to the common drivetrain 30 via the rower power transmission member 304 (e.g., a belt). It is noted that the coupling of the pulleys 344 to the common drivetrain 30 via the rower power transmission member 304 may permit further gearing of the components to provide suitable ratio and resistance to pulling during use. It also provides the pulleys 344 the ability to recoil the coupling members 342 about the pulleys 344 without disrupting function of the common drivetrain 30 and the resistance provided by the resistance member 50. In some embodiments, the drive member 302 is supported on the frame 20 of the exercise machine 10. It is within the scope of the disclosure that the drive member 302 may also be supported on other secondary structure. It is also noted that foot pads 360 against which the used may push for performing the rowing motion may be positioned either on the frame 20 or otherwise.

Components of the rowing machine attachment 300 may also be used independent from each other to accomplish other exercises. For example, as seen in FIG. 18, the handles 340 may include a first portion 350 and a second portion 352 which can be separated. The handles 340 may be used either together as a single unit or separated into the first portion 350 and the second portion 352. This allows the handles 340 to be used in combination or to have a separate handle for each hand, thus providing alternate workouts for a user. Furthermore, the handles 340 may be used without the frame member 308 for other resistance workouts other than rowing (e.g., curls, butterflies, and so forth).

Although specific examples of attachments have been provided, as previously discussed, any number and type of attachment may be operable coupled to the common drivetrain 30. The common drivetrain 30 is operable to the receive user input and provide resistance (e.g., via the resistance member 50) to the user input. An electronic controller 400 may be implemented to control the resistance member 50 for providing various workout profiles. The electronic controller 400 may be operated via a user interface 402 that is supported on the exercise machine 10 or may be used remotely via a remote user interface (e.g., a cellular device). The workout profiles may be programmed specific to the attachment, to the type of workout on the attachment, to the user (e.g., based on height, weight, goals, gender, etc.), and to a workout routine (e.g., rotating between attachments such as a circuit workout).

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

The following is claimed:

1. A modular exercise apparatus comprising:
   a frame;
   a common drivetrain supported by the frame and including a common axle, a plurality of input receivers coupled to the common axle, and a resistance member operably coupled to the common axle and operable to provide resistance against rotation of the common axle, wherein the common drivetrain is modular such that is reconfigurable to accommodate additional input receivers;
   a first exercise attachment including a first drive member operably coupled to a first input receiver of the plurality of input receivers of the common drivetrain; and
   a second exercise attachment including a second drive member operably coupled to a second input receiver of the plurality of input receivers of the common drivetrain, wherein the second drive member includes a first axle, a first bearing operably coupled to the first axle, a second axle, a second bearing coupled to the second axle, a belt operably coupling the first bearing and the second bearing, and a first gear coupled to the second axle, the second drive member maintaining predetermined tensioning on the belt when the second exercise attachment in an operational configuration and in a stowed configuration.

2. The modular exercise apparatus of claim 1, wherein the common drivetrain includes an output member, wherein the output member is operably coupled to the resistance member.

3. The modular exercise apparatus of claim 1, wherein the plurality of input receivers includes at least one of a belt bearing, a gear, and a sprocket.

4. The modular exercise apparatus of claim 1, wherein the plurality of input receivers are reconfigurable relative to the common axle.

5. The modular exercise apparatus of claim 4, wherein the plurality of input receivers are removable from and addable to the common axle.

6. The modular exercise apparatus of claim 1, wherein the first exercise attachment includes a stationary bicycle and the second exercise attachment includes an elliptical machine, the elliptical machine being stowable.

7. The modular exercise apparatus of claim 1, further comprising a third exercise attachment including a third drive member operably coupled to a third input receiver of the plurality of input receivers of the common drivetrain.

8. A combination exercise device comprising:
a stationary bicycle attachment including a stationary bicycle drive member having a first receiver member operable to receive a first mechanical user input and a first output member for transmitting the first mechanical user input;
an elliptical exercise attachment that is stowable and includes an elliptical exercise drive member having a second receiver member operable to receive a second mechanical user input and a second output member for transmitting the second mechanical user input, the second receiver member and the second output member each being separate from the first receiver member and the first output member, the elliptical exercise drive member further including a first axle, a first bearing operably coupled to the first axle, a second axle, a second bearing coupled to the second axle, a belt operably coupling the first bearing and the second bearing, and a first gear coupled to the second axle, the elliptical exercise drive member maintaining predetermined tensioning on the belt when the elliptical exercise attachment in an operational configuration and in a stowed configuration;
a common axle operably coupled to the stationary bicycle drive member to receive the first mechanical user input from the stationary bicycle attachment and operably coupled to the elliptical exercise drive member to receive the second mechanical user input from the elliptical exercise attachment, wherein the first gear of the elliptical exercise attachment is operable to transmit the second mechanical user input to a second gear coupled to the common axle; and
a resistance member operably coupled to the common axle and operable to provide mechanical resistance against the first mechanical user input and the second mechanical user input.

9. The combination exercise device of claim 8, wherein the elliptical exercise attachment includes linkage units selectively changeable between a fixed configuration and a non-fixed configuration, wherein the linkage units are in the fixed configuration when the elliptical exercise attachment is in an operational configuration and the linkage units are in the non-fixed configuration when the elliptical exercise attachment is being transitioned to a stowed configuration.

10. The combination exercise device of claim 8, further comprising a rower exercise attachment including a rower drive member having a third receiver member operable to receive a third mechanical user input and a third output member for transmitting the third mechanical user input, the third receiver member and the third output member each being separate from the first and second receiver members and the first and second output members.

11. The combination exercise device of claim 10, wherein the rower exercise attachment is stowable.

12. A combination exercise device comprising:
a stationary bicycle attachment including a stationary bicycle drive member having a first receiver member operable to receive a first mechanical user input and a first output member for transmitting the first mechanical user input;
an elliptical exercise attachment that is stowable and includes an elliptical exercise drive member having a second receiver member operable to receive a second mechanical user input and a second output member for transmitting the second mechanical user input, the second receiver member and the second output member each being separate from the first receiver member and the first output member, the elliptical exercise attachment including linkage units selectively changeable between a fixed configuration and a non-fixed configuration, wherein the linkage units are in the fixed configuration when the elliptical exercise attachment is in an operational configuration and the linkage units are in the non-fixed configuration when the elliptical exercise attachment is being transitioned to a stowed configuration;
a common axle operably coupled to the stationary bicycle drive member to receive the first mechanical user input from the stationary bicycle attachment and operably coupled to the elliptical exercise drive member to receive the second mechanical user input from the elliptical exercise attachment; and
a resistance member operably coupled to the common axle and operable to provide mechanical resistance against the first mechanical user input and the second mechanical user input.

13. The combination exercise device of claim 12, wherein the elliptical exercise drive member further includes a first axle, a first bearing operably coupled to the first axle, a second axle, a second bearing coupled to the second axle, a belt operably coupling the first bearing and the second bearing, and a first gear coupled to the second axle, the first gear operable to transmit the second mechanical user input to a second gear coupled to the common axle, the elliptical exercise drive member maintaining predetermined tensioning on the belt when the elliptical exercise attachment in an operational configuration and in a stowed configuration.

14. The combination exercise device of claim 12, wherein the elliptical exercise attachment includes linkage units selectively changeable between a fixed configuration and a non-fixed configuration, wherein the linkage units are in the fixed configuration when the elliptical exercise attachment is in an operational configuration and the arms are in the non-fixed configuration when the elliptical exercise attachment is being transitioned to a stowed configuration.

15. The combination exercise device of claim 12, further comprising a rower exercise attachment including a rower drive member having a third receiver member operable to receive a third mechanical user input and a third output member for transmitting the third mechanical user input, the third receiver member and the third output member each being separate from the first and second receiver members and the first and second output members.

16. The combination exercise device of claim 15, wherein the rower exercise attachment is stowable.

* * * * *